US011303950B2

(12) United States Patent
Smith et al.

(10) Patent No.: US 11,303,950 B2
(45) Date of Patent: *Apr. 12, 2022

(54) TRANSITIONING, FACILITATED BY A NETWORK ADDRESS RESOLVER, VIDEO BETWEEN DEVICES

(71) Applicant: Time Warner Cable Enterprises LLC, St. Louis, MO (US)

(72) Inventors: Robert Todd Smith, Boulder, CO (US); James C. Stark, Broomfield, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,812

(22) Filed: Aug. 19, 2019

(65) Prior Publication Data

US 2019/0373035 A1    Dec. 5, 2019

Related U.S. Application Data

(63) Continuation of application No. 13/355,925, filed on Jan. 23, 2012, now Pat. No. 10,389,778.

(51) Int. Cl.
*H04N 21/436* (2011.01)
*H04N 21/422* (2011.01)
(Continued)

(52) U.S. Cl.
CPC ..... *H04N 21/42224* (2013.01); *G06F 3/0488* (2013.01); *H04L 65/4084* (2013.01);
(Continued)

(58) Field of Classification Search
CPC ......... H04N 21/42224; H04N 21/4126; H04N 21/4222; H04N 21/436; H04N 21/47202;
(Continued)

(56) References Cited

U.S. PATENT DOCUMENTS 5,646,608 A * 7/1997 Shintani ................. H04B 1/202
340/3.7
5,838,326 A 11/1998 Card et al.
(Continued)

OTHER PUBLICATIONS

"TWCable TV for iPad Update" downloaded from http://www.timewarnercable.com/nynj/learn/cable/TWCableTV/TWCableTV_iPad.html on Dec. 17, 2011, 4 pages.
(Continued)

*Primary Examiner* — Jennifer N Welch
*Assistant Examiner* — K C Chen
(74) *Attorney, Agent, or Firm* — Otterstedt, Wallace & Kammer, LLP

(57) ABSTRACT

A plurality of icons are displayed on a companion device having a touch screen interface; the icons can be manipulated by the touch screen interface, and each of the plurality of icons represents a different one of a plurality of audiovisual assets which can be viewed on an external audiovisual device. An input gesture on the touch screen interface is obtained from a user of the companion device, wherein a given one of the icons is flicked in a manner associated with the external audiovisual device. Responsive to the obtaining of the gesture, a signal is dispatched from the companion device. The signal causes the external audiovisual device to access a given one of the plurality of audiovisual assets associated with the given one of the icons. Techniques for other than touch screen devices, and techniques to obtain programs on the companion device, are also provided.

9 Claims, 21 Drawing Sheets

(51) Int. Cl.
  *G06F 3/0488* (2022.01)
  *H04L 65/612* (2022.01)
  *H04N 21/41* (2011.01)
  *H04N 21/472* (2011.01)
  *H04N 21/61* (2011.01)
  *H04M 1/72469* (2021.01)
  *H04M 1/72415* (2021.01)

(52) U.S. Cl.
  CPC ..... *H04N 21/4126* (2013.01); *H04N 21/4222* (2013.01); *H04N 21/436* (2013.01); *H04N 21/47202* (2013.01); *H04N 21/6118* (2013.01); *H04N 21/6125* (2013.01); *H04M 1/72415* (2021.01); *H04M 1/72469* (2021.01)

(58) Field of Classification Search
  CPC ............ H04N 21/6118; H04N 21/6125; G06F 3/0488; H04L 65/4084; H04M 1/72415; H04M 1/72469
  See application file for complete search history.

(56) References Cited

U.S. PATENT DOCUMENTS

| | | | |
|---|---|---|---|
| 6,496,206 | B1 | 12/2002 | Mernyk et al. |
| 7,310,807 | B2* | 12/2007 | Pearson ............. H04N 21/4122 348/E5.003 |
| 8,370,428 | B1 | 2/2013 | Bayliss et al. |
| 8,935,300 | B1* | 1/2015 | Maeng ................... G06F 16/43 707/805 |
| 10,389,778 | B2 | 8/2019 | Smith et al. |
| 2002/0019980 | A1* | 2/2002 | Kikinis .................. H04N 21/47 725/39 |
| 2002/0184635 | A1* | 12/2002 | Istvan ................ H04N 21/4821 725/51 |
| 2003/0056217 | A1 | 3/2003 | Brooks |
| 2004/0034705 | A1 | 2/2004 | Focsaneanu |
| 2006/0130107 | A1 | 6/2006 | Gonder et al. |
| 2006/0143656 | A1* | 6/2006 | Sakamoto ........ H04N 21/42224 725/47 |
| 2007/0146347 | A1 | 6/2007 | Rosenberg |
| 2007/0217436 | A1 | 9/2007 | Markley et al. |
| 2007/0276925 | A1 | 11/2007 | La Joie et al. |
| 2008/0134274 | A1 | 6/2008 | Derrenberger et al. |
| 2009/0259515 | A1 | 10/2009 | Belimpasakis et al. |
| 2009/0293070 | A1 | 11/2009 | Greeff et al. |
| 2010/0069056 | A1* | 3/2010 | Pope .................. G06Q 30/0601 455/419 |
| 2010/0180298 | A1* | 7/2010 | Kim .................... H04N 21/4882 725/39 |
| 2010/0228758 | A1 | 9/2010 | Lim et al. |
| 2010/0303021 | A1 | 12/2010 | Cattani et al. |
| 2011/0007752 | A1 | 1/2011 | da Silva et al. |
| 2011/0138064 | A1 | 6/2011 | Rieger et al. |
| 2011/0162018 | A1 | 6/2011 | Dodd |
| 2011/0214061 | A1 | 9/2011 | King et al. |
| 2013/0148653 | A1 | 6/2013 | Howard et al. |

OTHER PUBLICATIONS

"iPad" downloaded from http://en.wikipedia.org/wiki/Ipad on Dec. 17, 2011, 26 pages.
"DOCSIS" downloaded from http://en.wikipedia.org/wiki/DOCSIS om Jan. 7, 2012, 7 pages.
"OpenCable Application Platform" downloaded from http://en.wikipedia.org/wiki/OpenCable_Application_Platform on Jan. 7, 2012, 3 pages.
Cable TV Labs Inc., Data-Over-Cable Service Interface Specifications,CM-SP-DSG-I19-111117, 2011, 192 pages.
Cable TV Labs Inc., OpenCable™ Application Platform Specifications,OpenCable Application Platform (OCAP),OC-SP-OCAP1.2-110512, 2011.
Digital Audio-Visual Council, DAVIC 1.5 Specification, Jitter concealment tools, p. i, ii, 1-6, 6-1 through 6-9, Jan. 22, 1999, 17 pages.
Digital Audio-Visual Council,DAVIC 1.5 Baseline 16,Applicability of DAVIC 1.5 Intranet Architecture to TV Anywhere and TV Anytime scenarios, p. i, ii, 1-6, Apr. 15, 1999, 8 pages.
Digital Audio-Visual Council,DAVIC 1.5 Specification, DAVIC Cable Modem, rev. 3.1, Nov. 6, 1998, 134 pages.
Digital Audio-Visual Council,DAVIC 1.5 Specification,DAVIC Intranet, rev 1.0, Apr. 12, 1999, 38 pages.
Digital Audio-Visual Council,DAVIC 1.5 Specifications,Revision 6.0,TV Anytime and TV Anywhere, 1999, 147 pages.
"Multimedia over Coax Alliance" downloaded from http://en.wikipedia.org/wiki/Multimedia_over_Coax_Alliance on Jan. 7, 2012, 3 pages.
"Digital Living Network Alliance" downloaded from http://en.wikipedia.org/wiki/Digital_Living_Network_Alliance on Jan. 7, 2012, 9 pages.
Howard Pfeffer, "Transitioning Video Call Between Devices", unpublished U.S. Appl. No. 13/554,728, filed Jul. 20, 2012.

* cited by examiner

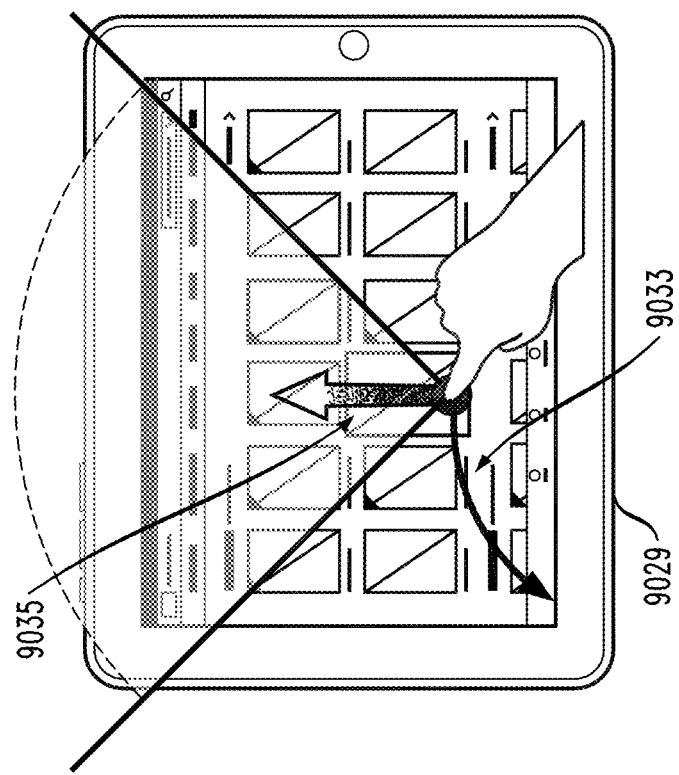
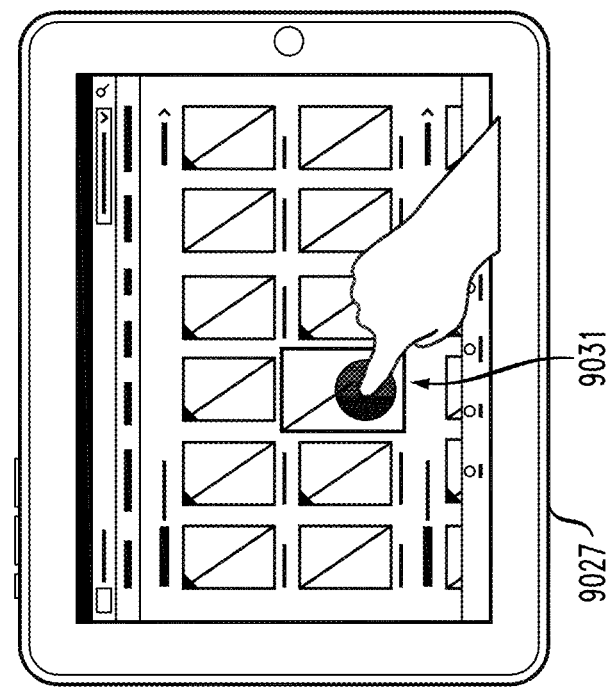
FIG. 11

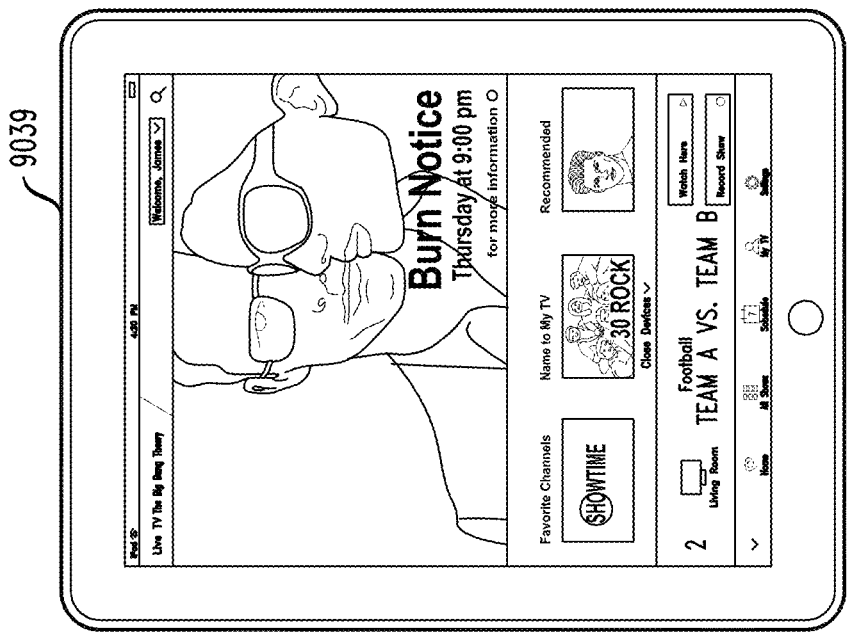
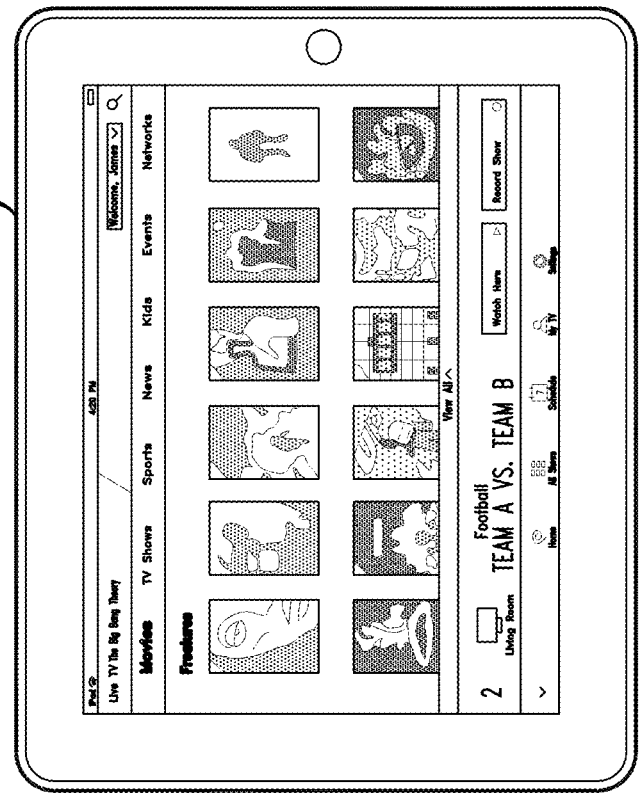
FIG. 12

FIG. 14

9045 — DRAG TO DEVICE
As the user drags an item towards the device icon, the title collapses.

9047 — EXPAND DEVICES
After the title collapses, all available devices expand outward from left to right.

9049 — DEVICE ICON SCALES
As the user closes in on a specific device, that device icon scales up from top center to greet the icon.

9051 — ICON NOTIFICATION
When the user releases, the intended icon changes color to reflect a successful action.

9053 — COMPLETE
After notifying the user of a successful action, the row of devices collapses to the left, leaving only the selected icon. The program title slides out from left to right.

FIG. 15

9055
DRAG TO NAVIGATION
THE USER DRAGS AN ITEM TOWARDS THE NAVIGATION AREA (TOP RIGHT).

9057
ADD TO PLAYLIST
THE USER CAN DRAG THE SELECTED ITEM TO THE MyTV FOLDER, WHICH WILL ADD THE PROGRAM TO THE USERS PLAYLIST. AS THE USER APPROACHES THE FOLDER ICON, IT SCALES TO GREET THE ICON.

9059
CONFIRMATION
WHEN THE USER RELEASES THE ITEM OVER THE MyTV ICON, THE ICON RETURNS TO ITS ORIGINAL SCALE, TURNS BLUE, AND A PLUS ICON APPEARS MOMENTARILY TO CONFIRM THE ACTION.

9061
COMPLETE
AFTER A MOMENT, THE PLUS ICON FADES AWAY WITH THE BLUE FOCUS STATE OF THE ICON, AND THE NAVIGATION ICONS ARE RETURNED TO NORMAL. AT THIS POINT, IF THE VIDEO MOVED TO AUTOMATICALLY REVEAL THE NAVIGATION ICONS, THEN THE VIDEO RETURN TO ITS ORIGINAL COORDINATES.

FIG. 17

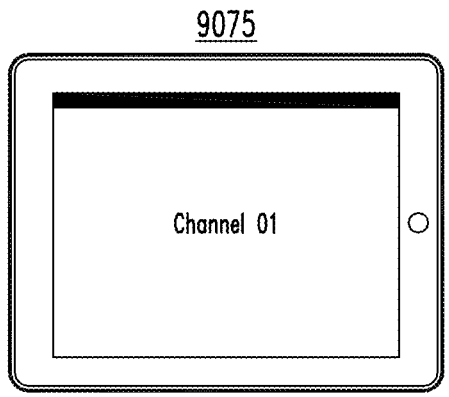

9075

WATCHING VIDEO
FROM THE VIDEO PLAYER, THE USER DECIDES THEY WOULD LIKE TO WATCH THE CURRENT VIDEO ON THEIR LARGE SCREEN TV

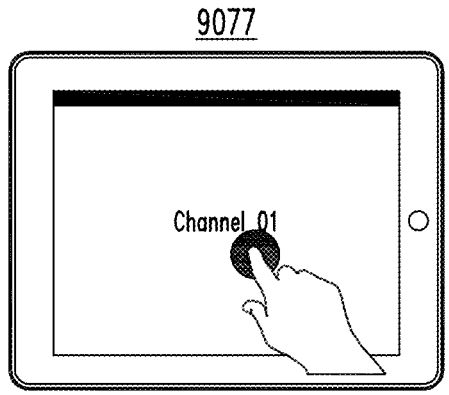

9077

DEVICES
THE USER PRESSES AND HOLDS ON THE VIDEO TO "GRAB" IT.

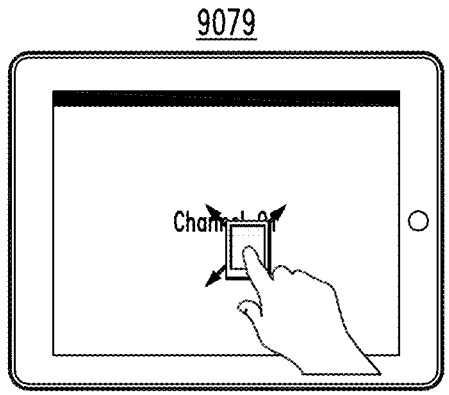

9079

SWITCH DEVICES
AFTER A MOMENT, THE BOX ART FOR THE CURRENT VIDEO POPS UP, ATTACHED TO THE USERS FINGER.

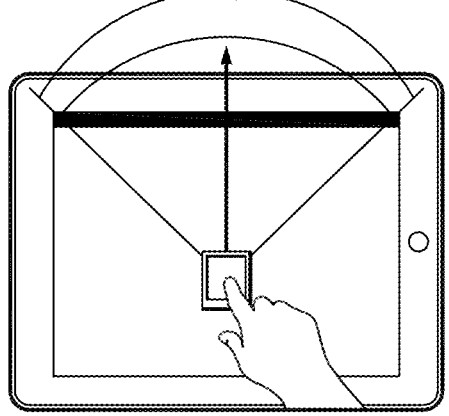

9081

FLICK TO TUNE
IF THE USER "FLICKS" THE VIDEO TOWARD THE TOP OF THE UI, THEN THE CURRENTLY ASSOCIATED SET TOP WILL TUNE THE PROGRAM.

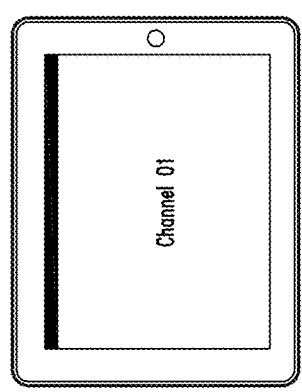

9083

WATCHING VIDEO

FROM THE VIDEO PLAYER, THE USER DECIDES THEY WOULD LIKE TO ADD THE CURRENT PROGRAM TO THEIR PLAYLIST.

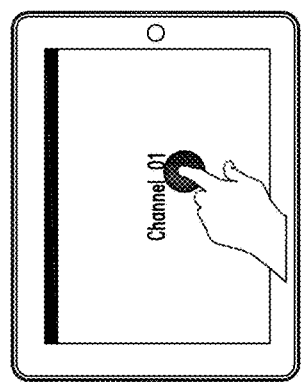

9085

DEVICES

THE USER PRESSES AND HOLDS ON THE VIDEO TO "GRAB" IT.

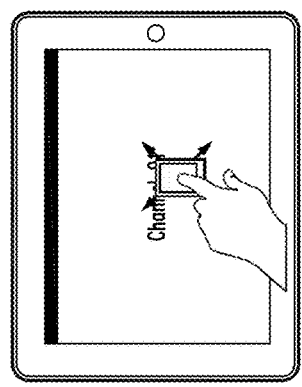

9087

SWITCH DEVICES

AFTER A MOMENT, THE BOX ART FOR THE CURRENT VIDEO POPS UP, ATTACHED TO THE USERS FINGER.

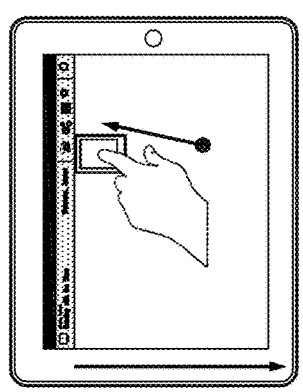

9089

DRAG TO PLAYLIST

AS THE USER DRAGS THE ICON TOWARD THE TOP OF THE UI, THE VIDEO SLIDES DOWN REVEALING THE NAVIGATION ICONS. THE USER MAY CHOOSE TO DROP THE BOX ART ON THE PLAYLIST OR SHARE ICONS. AS THE USER DRAGS TOWARD THE ROW OF ICONS, THE ICONS SCALE TO MEET THE BOX ART.

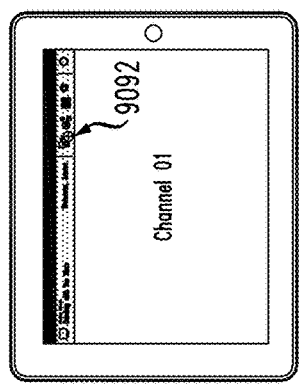

9091

DROP TO PLAYLIST

THE USER DROPS THE BOX ART ON THE PLAYLIST ICON. IF THE PROGRAM WAS A LINEAR BROADCAST, THEN A RECORDING IS CREATED. IF THE PROGRAM WAS AN ON DEMAND SESSION, THEN A BOOKMARK IS CREATED. SUCCESSFULLY ADDING AN ITEM TO THE PLAYLIST IS REFLECTED WITH A "PLUS" THAT APPEARS BRIEFLY OVER THE ICON, AND THE FOLDER ICON TURNS BLUE.

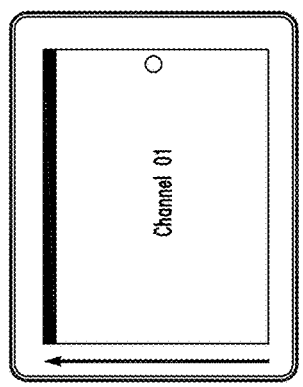

9093

FULLSCREEN VIDEO

AFTER THE USER SUCCESSFULLY ADDS THE PROGRAM TO THEIR PLAYLIST, THE VIDEO SLIDES UP, RETURNING TO IT'S ORIGINAL COORDINATES.

*FIG. 18*

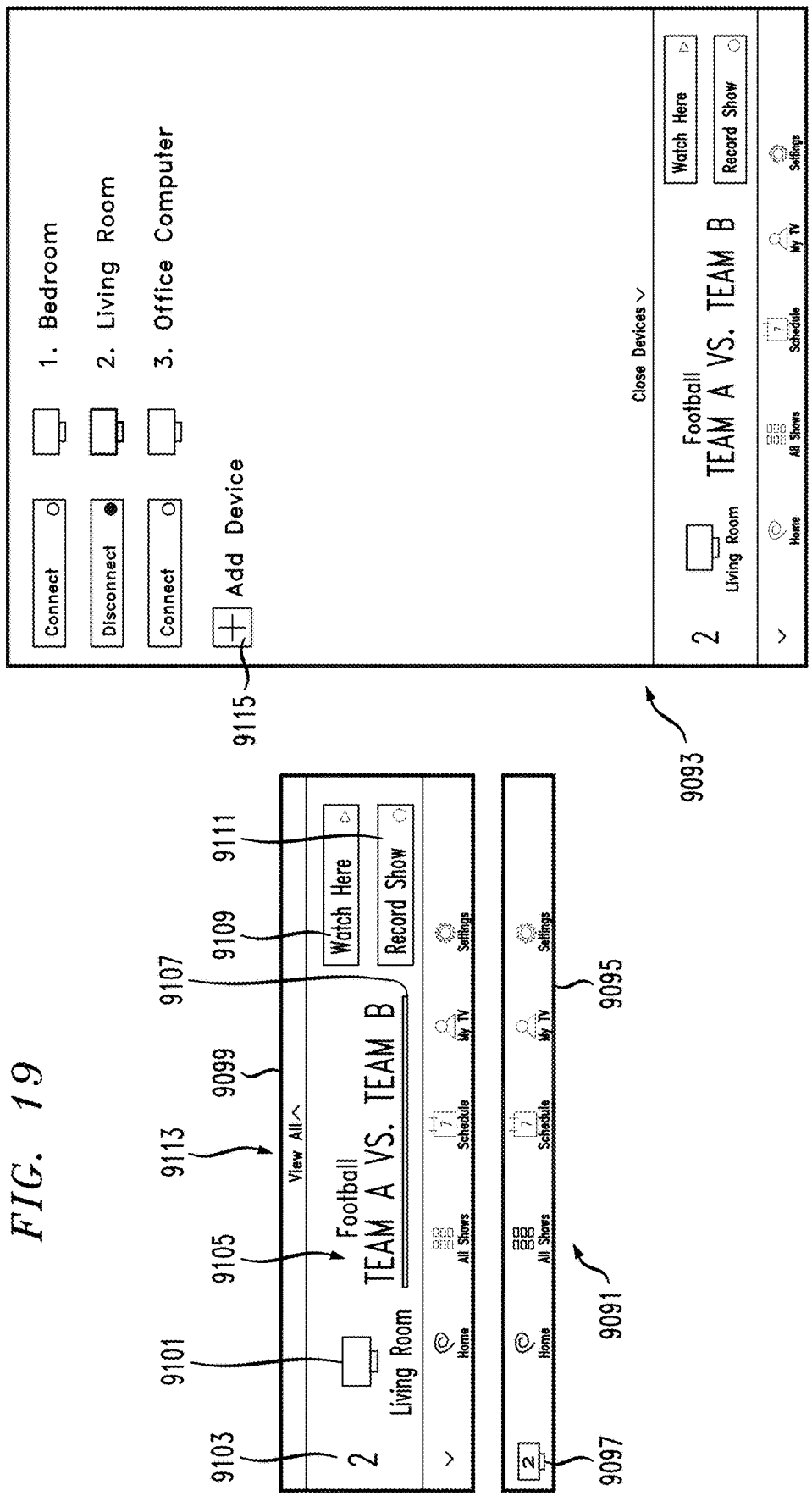

FIG. 20

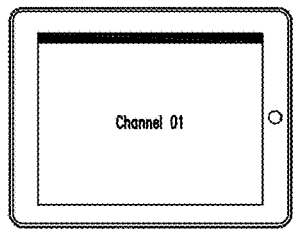

9117 — WATCHING VIDEO
FROM THE VIDEO PLAYER, THE USER DECIDES THEY WOULD LIKE TO WATCH THE CURRENT VIDEO ON THEIR LARGE SCREEN TV.

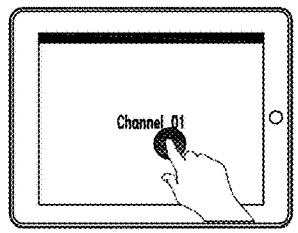

9119 — DEVICES
THE USER PRESSES AND HOLDS ON THE VIDEO TO "GRAB" IT.

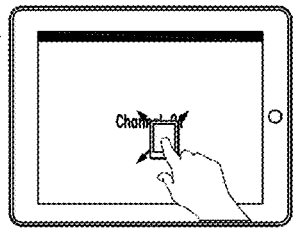

9121 — SWITCH DEVICES
AFTER A MOMENT, THE BOX ART FOR THE CURRENT VIDEO POPS UP, ATTACHED TO THE USERS FINGER.

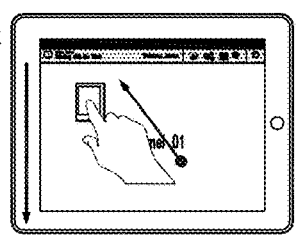

9123 — DRAG TO DEVICES
IF THE APPLICATION IS NOT CURRENTLY ASSOCIATED WITH THE CORRECT DEVICE, THE USER MAY DRAG TO THE TOP LEFT OF THE INTERFACE TO EXPOSE THE DEVICE ICON. AS THE USER APPROACHES THE TOP OF THE UI, THE VIDEO SLIDES DOWN REVEALING THE NAVIGATION HEADER WITH THE DEVICE ICON.

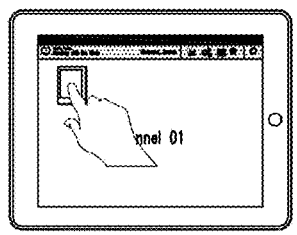

9125 — MULTIPLE DEVICES
AS THE USER APPROACHES THE DEVICE ICON, SEPARATE ICONS FOR EACH DEVICE AVAILABLE SLIDE OUT FROM UNDERNEATH THE ASSOCIATED DEVICE ICON.

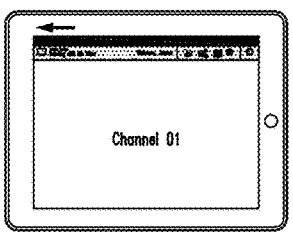

9127 — DROP ON DEVICE
ONCE ALL DEVICES ARE REVEALED, THE USER CHOOSES TO WATCH THE PROGRAM ON DEVICE 2 BY DROPPING THE BOX ART ON THAT DEVICES ICON. WHEN THE USER RELEASES THE BOX ART, THE ICON FOR THE SELECTED DEVICE TURNS BLUE TO INDICATE THAT THE ACTION WAS SUCCESSFUL.

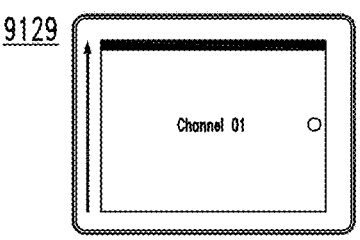

9129 — FULLSCREEN VIDEO
AFTER THE USER SELECTS A NEW DEVICE FROM THE LIST, THE VIDEO SLIDES UP, RETURNING TO IT'S ORIGINAL COORDINATES. FROM THIS POINT FORWARD, THE DEFAULT DEVICE TO THE DEVICE THE USER INDICATED BY DROPPING THE ICON TO TUNE.

TRANSITIONING, FACILITATED BY A NETWORK ADDRESS RESOLVER, VIDEO BETWEEN DEVICES

CROSS-REFERENCE TO RELATED APPLICATION

This application is a continuation of co-assigned U.S. patent application Ser. No. 13/355,925 of inventors Robert Todd Smith et al., and claims the benefit thereof, said application Ser. No. 13/355,925 having been filed on Jan. 23, 2012, and entitled "TRANSITIONING VIDEO BETWEEN DEVICES USING TOUCH GESTURES." The complete disclosure of the aforesaid application Ser. No. 13/355,925 is expressly incorporated herein by reference in its entirety for all purposes. Said application Ser. No. 13/355,925 is currently granted as U.S. Pat. No. 10,389,778, issued on Aug. 20, 2019.

FIELD OF THE INVENTION

The present invention relates generally to communications systems and methods, and, more particularly, to techniques for viewing video and the like.

BACKGROUND OF THE INVENTION

At one time, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. The existing cable network topology was originally optimized for downstream (toward the subscriber) only service. New equipment was added to the network to provide two-way communication.

SUMMARY OF THE INVENTION

Principles of the present invention provide a mechanism for transitioning video between a television and a tablet computer or the like. In one aspect, an exemplary method includes the step of displaying, on a companion device having a touch screen interface, a plurality of icons which can be manipulated by the touch screen interface. Each of the plurality of icons represents a different one of a plurality of audiovisual assets which can be viewed on an external audiovisual device. Further steps include obtaining, from a user of the companion device, an input gesture on the touch screen interface, wherein a given one of the icons is flicked in a manner associated with the external audiovisual device; and, responsive to the obtaining of the gesture, dispatching a signal from the companion device. The signal causes the external audiovisual device to access a given one of the plurality of audiovisual assets associated with the given one of the icons.

In another aspect, another exemplary method includes the step of displaying, on a companion device, a plurality of icons. Each of the plurality of icons represents a different one of a plurality of audiovisual assets which can be viewed on an external audiovisual device. Further steps include obtaining, at the companion device, from a network address resolver at a remote location, a network address of the external audiovisual device; obtaining, from a user of the companion device, a selection of a given one of the icons; and, responsive to the selection, dispatching a signal from the companion device, to the network address of the external audiovisual device, to cause the external audiovisual device to access a given one of the plurality of audiovisual assets associated with the given one of the icons.

In still another aspect, still another exemplary method includes the step of displaying, on a companion device, a plurality of icons. Each of the plurality of icons represents a different one of a plurality of external audiovisual devices with which the companion device can be associated. A further step includes obtaining, at the companion device, a selection from a user thereof. The selection specifies a given one of the plurality of external audiovisual devices to be currently associated with the companion device. Still further steps include displaying, on the companion device, data about a program currently playing on the given one of the external audiovisual devices that is currently associated with the companion device; obtaining, at the companion device, an indication from a user thereof, that the user desires to watch, on the companion device, the program currently playing on the given one of the external audiovisual devices that is currently associated with the companion device; and, responsive to the indication, playing, on the companion device, the program currently playing on the given one of the external audiovisual devices that is currently associated with the companion device.

In a further aspect, a further exemplary method includes the steps of providing, to a companion device, from a web service executing on an external audiovisual device, an identity of a program currently playing on the external audiovisual device; obtaining, from the companion device, at the external audiovisual device, an indication that the program currently playing on the external audiovisual device is to be streamed to the companion device; and, responsive to the indication, streaming the program currently playing on the external audiovisual device to the companion device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, some embodiments advantageously maximize the use of the quadrature amplitude modulation (QAM) network while taking advantage of the over-the-top internet protocol (IP) network as opposed to pure IP video, thereby making more efficient use of existing communications network assets.

These and other features and advantages of the present invention will become apparent from the following detailed description of illustrative embodiments thereof, which is to be read in connection with the accompanying drawings.

BRIEF DESCRIPTION OF THE DRAWINGS

FIG. 11 shows features of an exemplary gesture-based tuning process, according to an aspect of the invention;

FIGS. 12 and 13 show features of an exemplary enhanced device user interface, according to an aspect of the invention;

FIG. 14 shows exemplary interaction with device icons, according to an aspect of the invention;

FIG. 15 shows exemplary appending of material to a playlist, according to an aspect of the invention;

FIG. 17 shows further features of an exemplary gesture-based tuning process, according to an aspect of the invention;

FIG. 18 shows exemplary addition of a program to a playlist, according to an aspect of the invention;

FIG. 19 shows further features of an exemplary enhanced device user interface, according to an aspect of the invention;

FIG. 20 shows exemplary tuning to a device, according to an aspect of the invention.

DETAILED DESCRIPTION OF PREFERRED EMBODIMENTS

Embodiments of the invention may be implemented in a variety of contexts. Purely by way of example and not limitation, embodiments will be shown in the context of a cable multi-service operator (MSO) providing data services as well as entertainment services.

Figure 1:
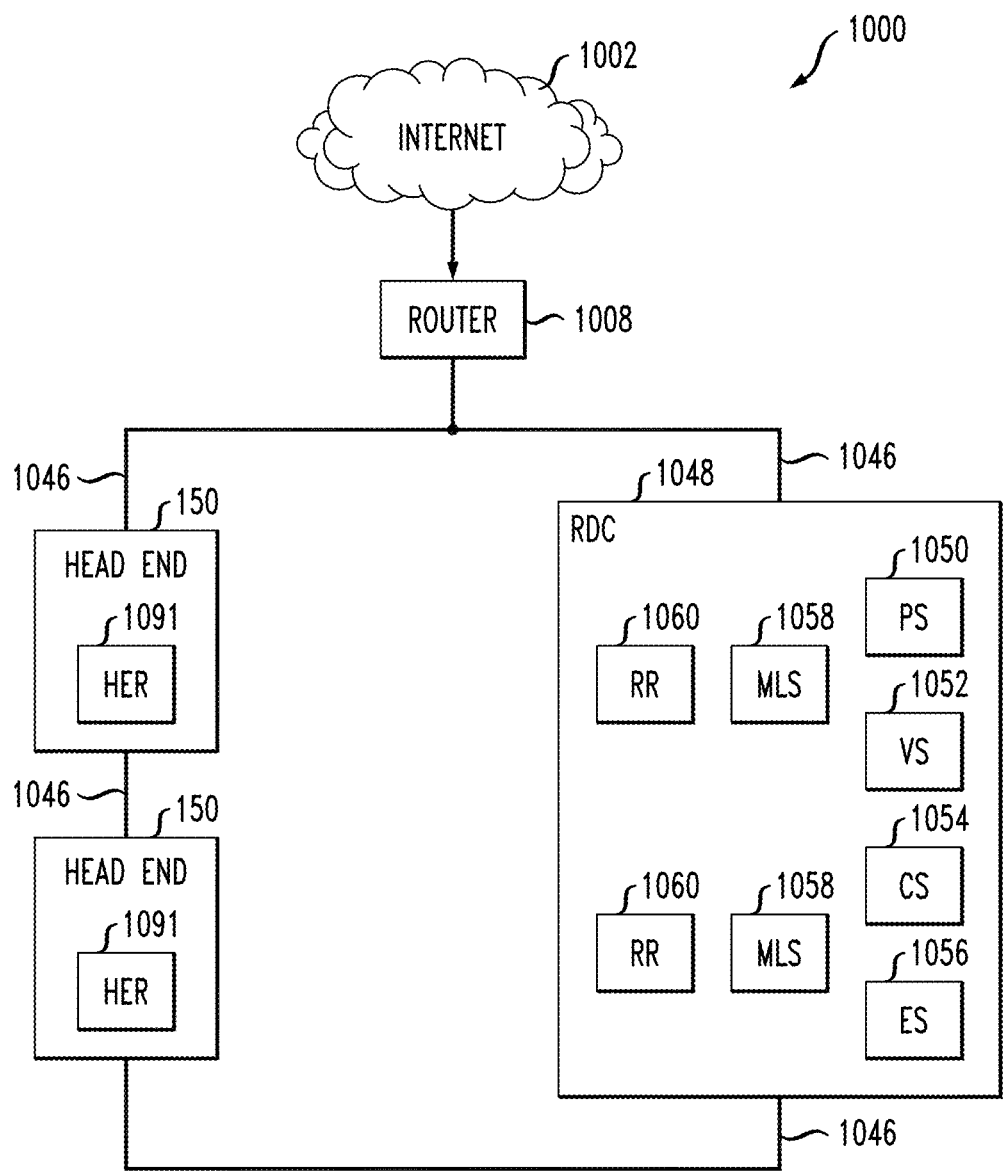
FIG. 1 is a block diagram of an exemplary embodiment of a system, within which one or more aspects of the invention can be implemented.

FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from FIGS. 2-4 below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

Figure 2:
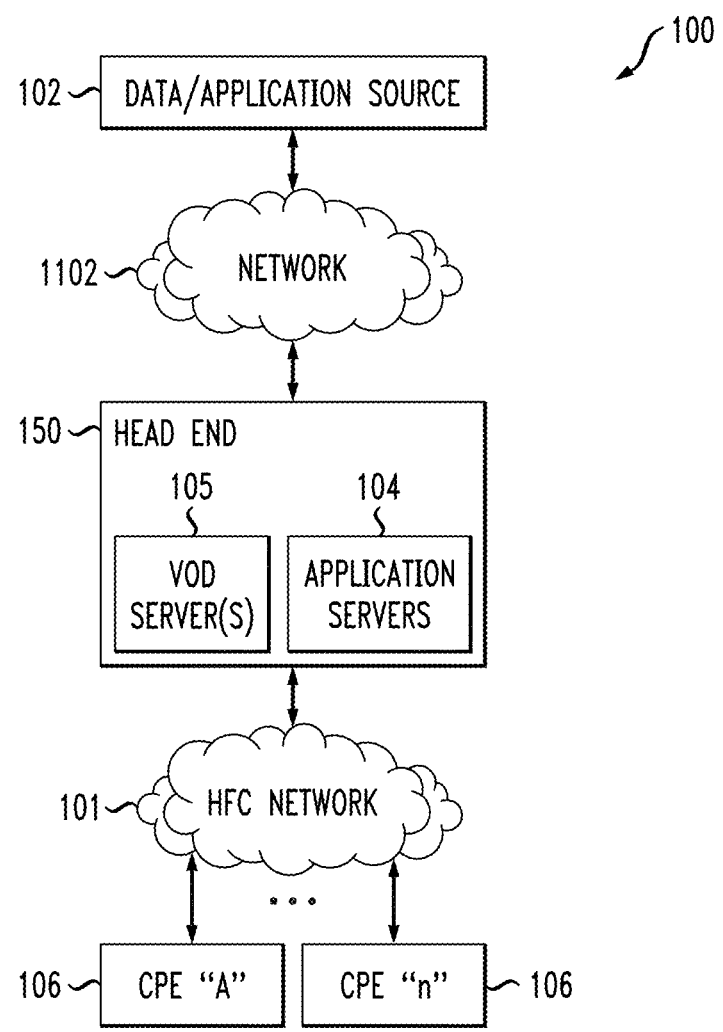
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within RDC 1048 or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes, routers such as premises gateway routers, and high-speed cable modems for providing high bandwidth Internet access in premises such as homes and businesses.

Figure 3:
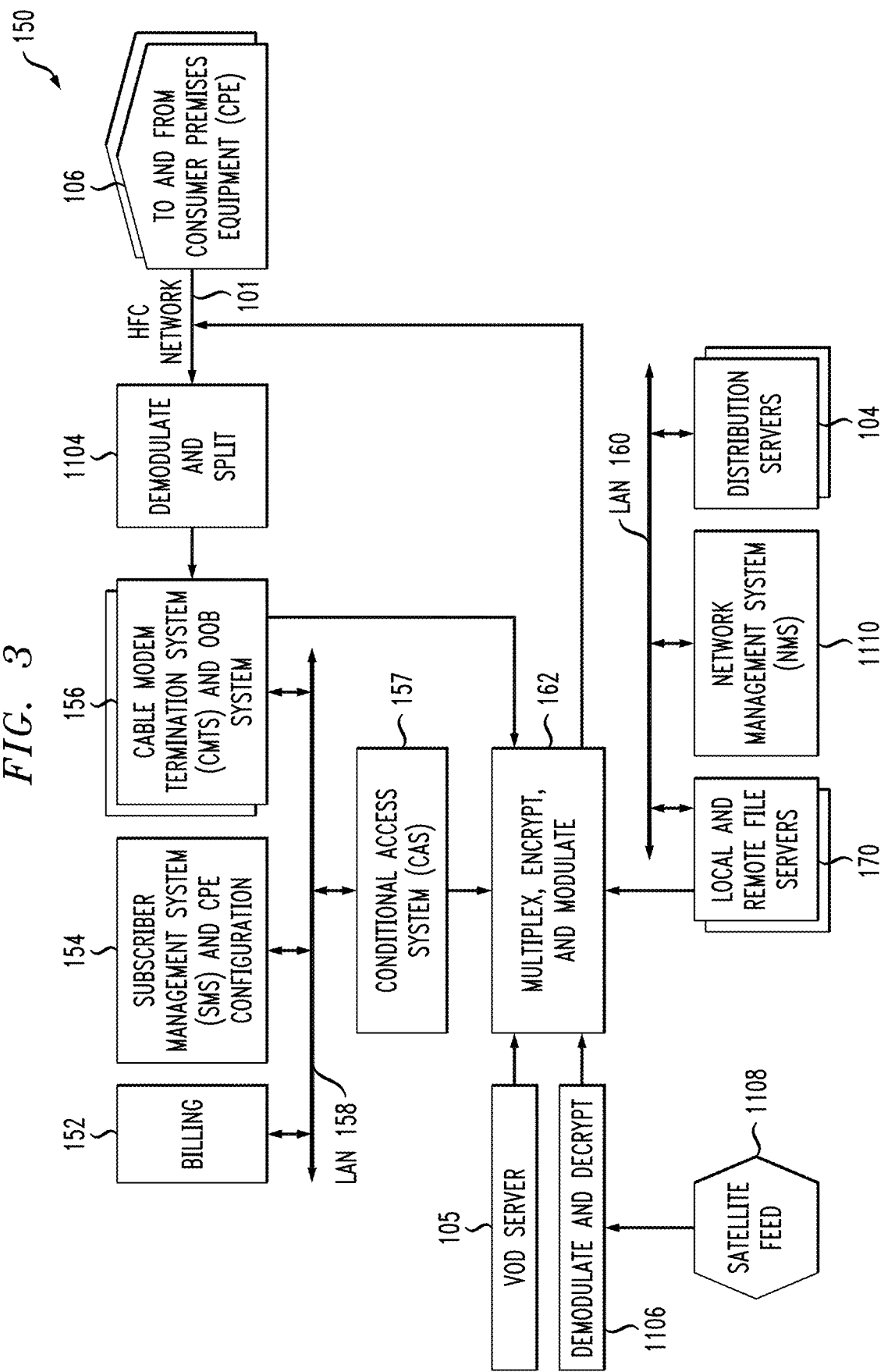
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as, for example, where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. The DOCSIS Set-top Gateway (DSG) Interface Specification, CM-SP-DSG -I19-111117, and the OpenCable™ Application Platform Specifications, OpenCable Application Platform (OCAP), OC-SP-OCAP1.2-110512, both available from the aforementioned Cable Television Laboratories, Inc., are expressly incorporated herein by reference in their entireties for all purposes. Furthermore, the DAVIC 1.0 through 1.5 specifications, inclusive, available from DAVIC, the Digital Audio Video Council, are also expressly incorporated herein by reference in their entireties for all purposes. Yet further, the MoCA 1.0, 1.1, and 2.0 specifications, inclusive, available from the Multimedia over Coax Alliance (MoCA), are also expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1104 are fed to CMTS and OOB system 156.

Figure 4:
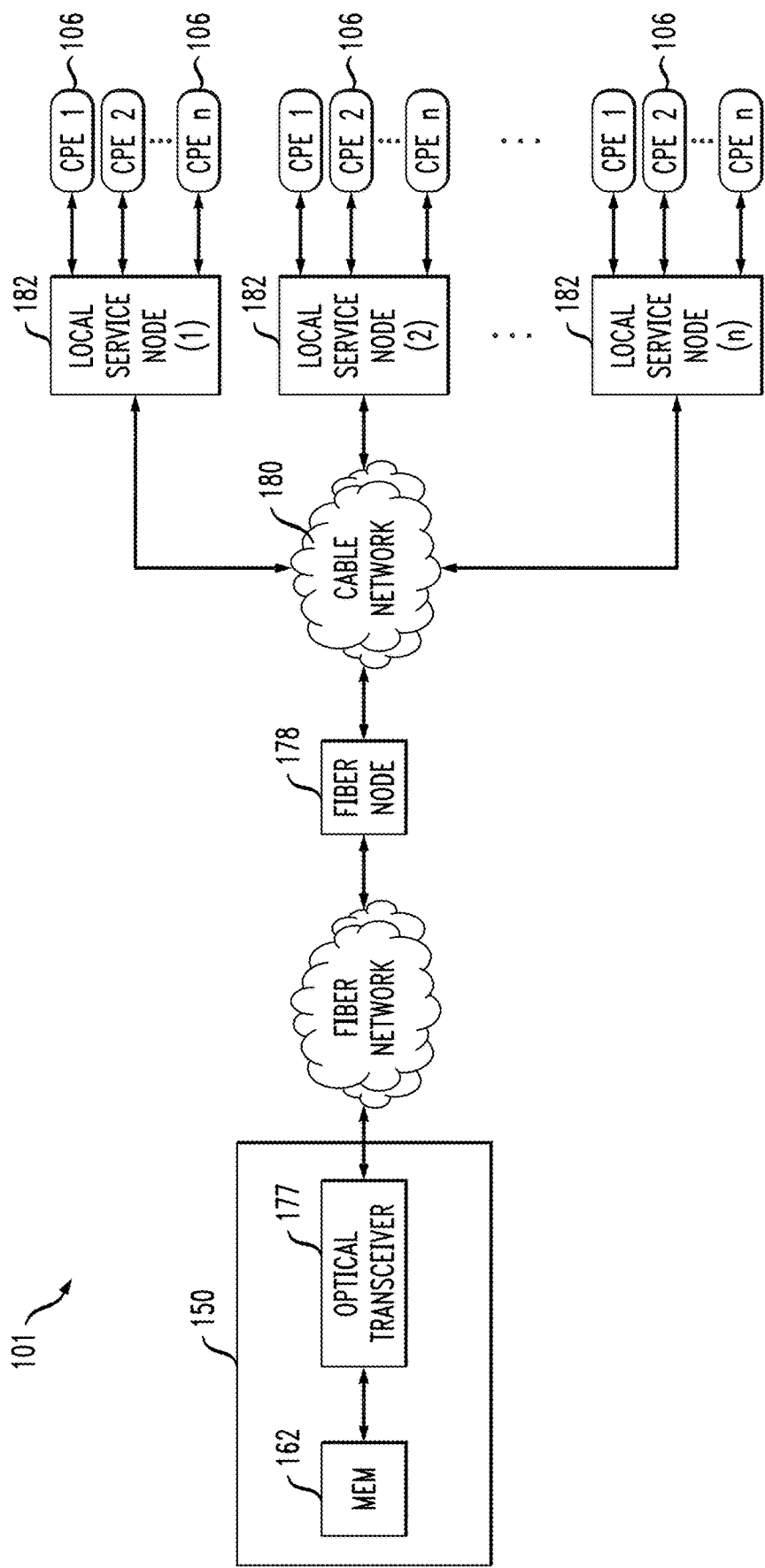
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM).

In another aspect, the network 101 may be a switched digital network, as known, for example, from US Patent Publication 2003/0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-4 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

One or more embodiments advantageously provide a gesture-based tuning feature. Tablets and similar companion type devices are becoming more prevalent in the home. In one or more embodiments, such devices are used to augment the search and discovery process for finding content (e.g., programming content), which shows to watch, and so on. High-resolution touch screen displays represent the programs available, whether linear or on demand, from a digital video recorder (DVR) or a network digital video recorder (NDVR), as so-called "show cards" which may include, for example, small pieces of box art. Gesture-based devices, in one or more embodiments, advantageously permit the user to reach out and interact with the user interface (UI) that is being displayed on the actual device. Such interfaces are referred to as a track and manipulation interface. One or more embodiments, instead of just mimicking what a cable box currently does, which is somewhat burdened by the abstraction layer of a conventional remote control, actually put some or all of the content on companion-type devices and allow the user to interact with them by touch.

One or more embodiments provide one or more new applications wherein a user can simply "grab" box art and manipulate it. For example, a user may be browsing a grid of box art for on demand movies, and may press and hold on one of the pieces of box art momentarily, and then "throw" it off the top of the UI. That in turn sends a message to the set top box to begin the desired session or to join the desired stream live. In one or more embodiments, tapping that box art also allows the user to go into a more detailed state about that program, and from that state, he or she can also press and hold on that artwork to focus it and then "throw" it off the top of the UI.

In some cases, on such a direct manipulation interface, "everything" is "tactile"; i.e., the user is able to drag and manipulate "everything." In some cases, word-based actions such as PLAY, WATCH, and the like are avoided and the user is permitted to organize and control these attributes or actions simply by "grabbing" them, dragging and dropping them, and so on. For example, the user can drag artwork up to a folder at the top of the UI and drop it to create a recording. In the case of on-demand video, the user could create an item for his or her playlist (in video-on-demand or VOD, as opposed to broadcast, material is stored; for example, on or in association with a VOD server in a head end, and a user can watch this recorded material "on demand"). In some instances, the user can drag the art to another part of the UI that exposes all of the TVs or STBs that are available to the user, and he or she can drop the program onto a particular TV/STB, so that he or she can tune many set tops from one location and one device.

Thus, one or more embodiments permit focusing on a piece of content and then "flicking" it to instruct an STB to take some kind of action. Furthermore, in addition to or in lieu of such functionality, some embodiments permit the user to reach out to the set top/TV and allow the companion device (e.g., tablet) to take hold of whatever is playing on that TV. One or more embodiments facilitate such functionality via an enhanced device user interface. The enhanced device user interface is a portion of the UI experience that the user can expose, and it advises the user what device he or she is currently paired with and what program that device is playing; for example, it is playing back program X, program X is 50% through, optionally there are one or more controls that the user can take over and use to record or watch. In one or more embodiments, the user simply taps on the representation of the device (e.g., set-top box (STB)) on the UI and the tablet or similar device requests from the STB what the STB is currently playing, which may be live, on demand, or bookmarked, and then that video is presented on the local (e.g., tablet) device, and the user can take that program with him or her on his or her tablet or similar device.

Thus, in one or more embodiments, a tablet or other companion device carries out the majority of search and discovery for programming, can be used to tune any STB in the house, and/or can also be used to reach out to an STB and "grab" that video and take it along on the companion device.

Thus, in one or more embodiments, a tablet or similar device allows the user to select what he or she wants to watch on the STB/TV and/or allows the user to capture what is being displayed on a particular set top and look at it right on the tablet or the like instead of the associated TV/video monitor.

One preferred but non-limiting form of tablet computing device is the iPad® tablet computing device (registered mark of Apple Inc., Cupertino, Calif., USA). However, embodiments of the invention are not limited to this particular form of tablet device, or indeed to tablet devices in general—other exemplary devices include so-called smart phones, other types of portable electronic device having a display with a touch screen, and the like. Some embodiments can be used with click and drag interfaces to click and drag on box art on a laptop computer or the like.

One or more embodiments include, from an overall system perspective, one or more STBs, the tablet or similar device, and an application web server existing in the network cloud. This server is responsible for providing information about the STBs in the user's house so that the tablet or similar device "knows" and there is appropriate communication with the STB regarding network addresses. When the user brings up the appropriate application on the tablet or similar device it accesses the application web server but then the application is running on the tablet or similar device and communicating directly with all the STB(s) on the user's account to determine what is currently playing; it then allows the user to "home" his or her session to one of those STBs so that it can perform searches and/or "grab" content as described elsewhere herein.

Figure 5:
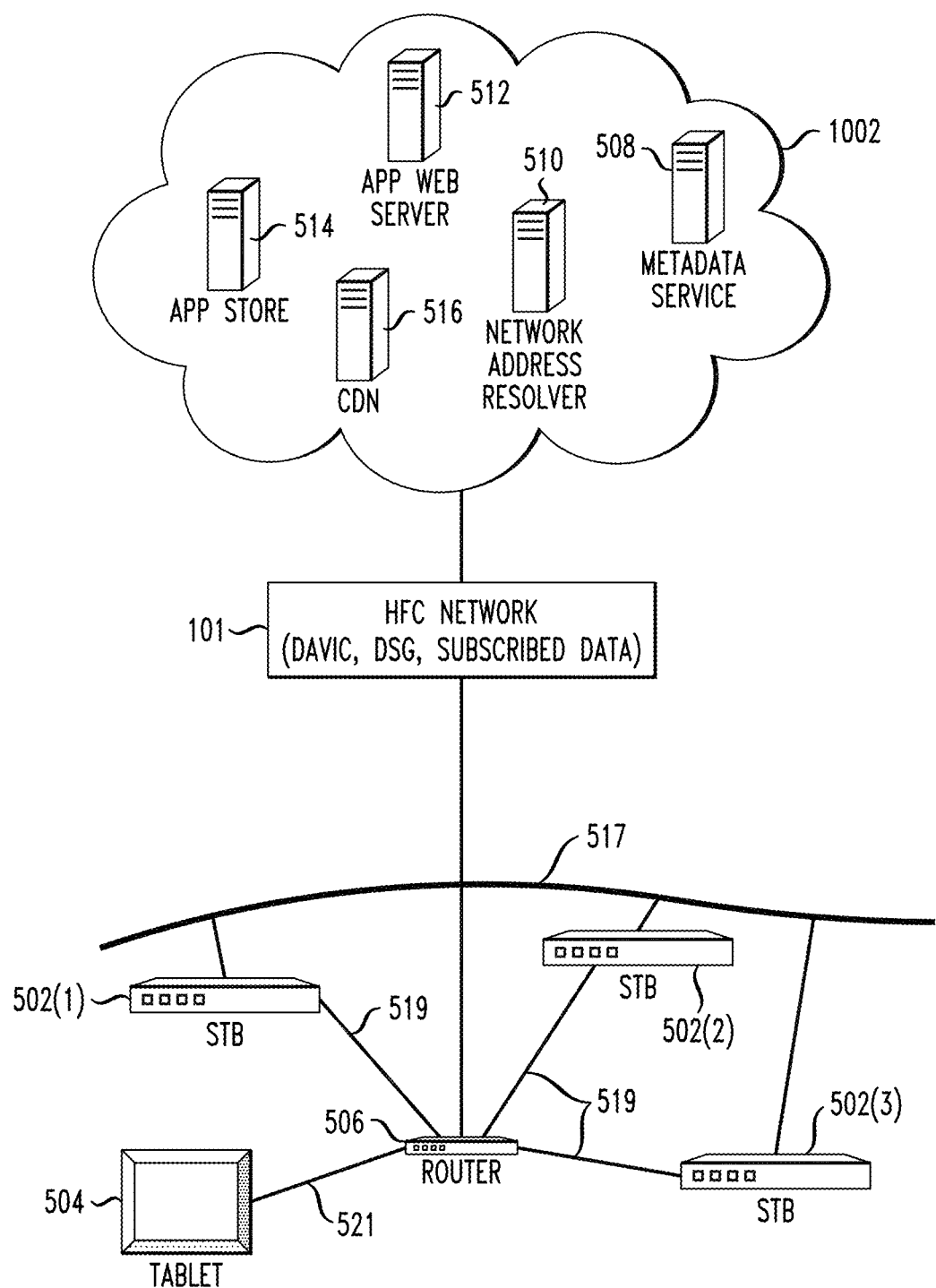
FIG. 5 is an exemplary embodiment of a system, in accordance with an aspect of the invention.

Referring now to FIG. 5, in a non-limiting exemplary embodiment, set top boxes (STB) 502(1), 502(2), 502(3), also known as digital home communication terminals (DHCTs), have direct wired data connectivity to the HFC network 101; for example, in accordance with DAVIC (Digital Audio Video Council) specifications or via the DOCSIS Set-top Gateway (DSG) specification describing how out of band data is delivered to a cable set-top box.

A variety of different network configurations can be employed in one or more embodiments. In at least some instances, the STBs 502 each have a physical cable connection 517; for example, via physical coaxial cables running to a splitter coupled to the cable service entrance to the premises. Router 506, in one or more embodiments, includes, or is coupled to, a cable modem. STBs 502 may each also have a logical connection 519 to router 506. Tablet 504 may have, for example, a wireless connection 521 to router 506. In some instances, STBs 502 may have two different IP addresses; for example, a local MoCA address and, if the STB is enabled for DSG, a DSG IP address. Tablet 504 may use, for example, DSG or non-DSG techniques. STBs 502 may have Ethernet ports and/or may have MoCA connectivity or the like. In some cases, video may be provided to tablet 504 via IPTV from the network cloud. In an alternative approach, IPTV video can be streamed to the tablet 504 from a given one of the STBs 504; for example, using digital living network alliance (DLNA) capability. It should be noted that in some cases, STBs 502 consume video provided via QAM over network 101, while tablet 504 or the like consumes IPTV video obtained from the network cloud or streamed from one of the STBs. When IPTV and QAM video both travel over HFC network 101, QAM travels over bandwidth reserved for broadcast while data such as IPTV packets travels over a different bandwidth reserved for data. Furthermore, in some cases, the video consumed on STBs 502 or the like is IPTV rather than QAM.

STBs 502(1), 502(2), 502(3) may also be connected to a home network via MoCA or other wiring. A router 506 provides network routing to devices in the home. A tablet device 504 (or any computer) in the home loads a native program from a tablet-specific "app" (application) store 514 (e.g. the Apple Inc. App Store) or a web application (e.g. HTML, JavaScript) from a web application server 512 via the subscriber's data subscription over the HFC network 101. In one or more embodiments, this application provides the functionality described elsewhere herein.

The application running on 504 ("transition application") requests the network address of the STBs 502(1), 502(2), 502(3) in the home from the Network Address Resolver service 510 using the subscriber's data subscription connectivity. Network Address Resolver service 510 maps subscriber accounts to STBs and STBs to network addresses. Network addresses may be DSG or in-home network (IHN) MoCA addresses depending on how the MSO has set up the HFC network and whether a MoCA network is in place in the home. DSG addresses are obtained by communicating with other services (not shown) in the head end 150. MoCA addresses are reported to Network Address Resolver service 510 by the STBs.

The transition application communicates directly with the STBs 502(1), 502(2), 502(3) using the IHN or DSG network address provided by Network Address Resolver service 510 to obtain their current state (e.g. what channel is being viewed or what VOD asset or recorded show is being played). The STBs provide an HTTP web-service for this purpose.

The transition application allows the user to select a STB to associate with the user interface of tablet 504.

The transition application communicates with the Metadata Service 508 to obtain enhanced data regarding the shows being viewed or any others that may be available in the schedule or on demand. The data is enhanced in the sense that it is not available directly from the STBs. Such data might be available, for example, at the head end, via an interface to an external source of electronic program guide (EPG) data, such as Tribune Media Services.

The transition application uses the show information from the associated STB to allow the user to "grab" the show and play it on tablet 504. The show is then streamed over the subscriber's data connection 101 from a Content Data Network 516. In some cases, this is via IP packets not QAM.

The application running on 504 allows the user to "flick" the streaming video to any one of the STBs 502(1), 502(2), 502(3) using a web service 999 or other application on the selected STB to play the show on the STB. The STB uses the QAM streams on the HFC connection 101 to tune the show.

Figure 6:
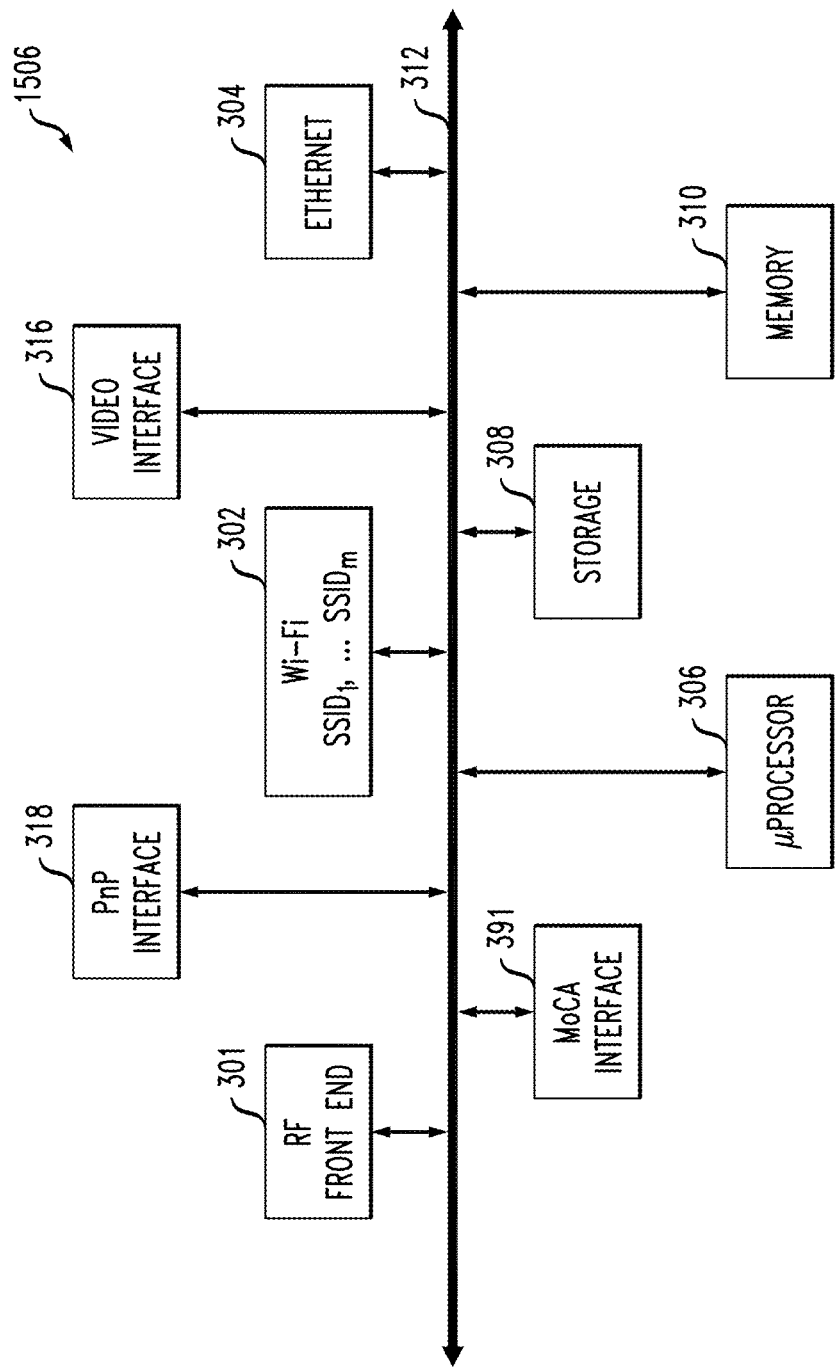
FIG. 6 is an exemplary block diagram of a router forming a portion of the system of FIG. 5.

FIG. 6 is a block diagram of one exemplary embodiment of the router 506 of FIG. 5, in the form of a premises gateway. However, it is to be emphasized that other embodiments may employ different configurations; for example, with less functionality. The exemplary router 506 includes an RF front end 301, Wi-Fi interface 302, video interface 316, "Plug n' Play" (PnP) interface 318 (for example, a UPnP interface) and Ethernet interface 304, each directly or indirectly coupled to a bus 312. Wi-Fi interface 302 could, for example, include a single wireless access point (WAP) running multiple ("m") service set identifiers (SSIDs). The microprocessor 306, storage unit 308, and memory unit 310 are also coupled to the exemplary bus 312, as is a suitable MoCA interface 391 to provide the aforementioned MoCA connectivity, if desired. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof. Again, some of the features might be eliminated in one or more embodiments; on the other hand, additional elements and/or interfaces could be included, such as, for example, an interface for the HomePlug A/V standard which transmits digital data over power lines, a PAN (e.g., 802.15), Bluetooth, or other short-range wireless interface for localized data communication, etc.

The router 506 can assume literally any discrete form factor, including those adapted for desktop, floor-standing, or wall-mounted use, or alternatively may be integrated in whole or part (e.g., on a common functional basis) with other devices if desired.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the router 506, software located in the storage unit 308 is run on the microprocessor 306 using the memory unit 310 (e.g., a program memory within or external to the microprocessor). The software controls the operation of the other components, and provides various other functions. Other system software/firmware may also be externally reprogrammed, such as using a download and reprogramming of the contents of the flash memory, replacement of files on the storage device or within other non-volatile storage, etc. This allows for remote reprogramming or reconfiguration of the router 506 by the MSO or other network agent.

The RF front end 301 of the exemplary embodiment comprises a cable modem of the type known in the art. In this fashion, content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

It will be appreciated, however, that the RF front end 301 of the CPE may comprise (either in addition to or in place of the cable modem) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

In some instances, the router 506 includes a DOCSIS cable modem for delivery of traditional broadband Internet services. This connection can be shared by all Internet devices in the premises 240; e.g. Internet protocol television (IPTV) devices, PCs, laptops, etc., as well as by tablet device 504. In addition, the router 506 can be remotely managed (such as from the head end 150, or another remote network agent) to support appropriate IP services.

In some instances the router 506 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, Personal Media Devices (PMDs), media extenders and set-top boxes. The coaxial network is merely the bearer; devices on the network utilize Ethernet or other comparable networking protocols over this bearer.

The exemplary router 506 acts as a Wi-Fi access point (AP), thereby allowing Wi-Fi enabled devices to connect to the home network and access Internet, media, and other resources on the network.

In one embodiment, Wi-Fi interface 302 comprises a single wireless access point (WAP) running multiple ("m") service set identifiers (SSIDs).

A premises gateway software management package (application) is also provided to control, configure, monitor and provision the router 506 from the cable head-end 150 or other remote network node via the cable modem (DOCSIS) interface. This control allows a remote user to configure and monitor the router 506 and home network.

The MoCA interface 391 can include, for example, a MoCA, retail compliant F-connector for providing data over coax capability. The exemplary MoCA port operates in the 1125-1525 MHz band, although other frequencies (MoCA compliant or otherwise) may be used for this purpose if desired. The MoCA frequencies can be multiplexed onto the cable input port of the router 506, or sent over another channel (e.g., dedicated channel or interface). The router 506 also optionally includes a switched packet interface between the Ethernet port and the MoCA interface. In one embodiment, data traffic flows through the router 506 between the Ethernet or other network interface and MoCA ports. In some cases, this occurs without requiring host processor intervention; in other instances, host processor intervention is a possibility.

As discussed above, the exemplary Wi-Fi wireless interface 302 is also configured to provide a plurality of unique service set identifiers (SSIDs) simultaneously. These SSIDs are configurable (locally or remotely), such as via a web page.

Note also that STBs 502 and router 506 are non-limiting examples of CPE 106.

Figure 7:
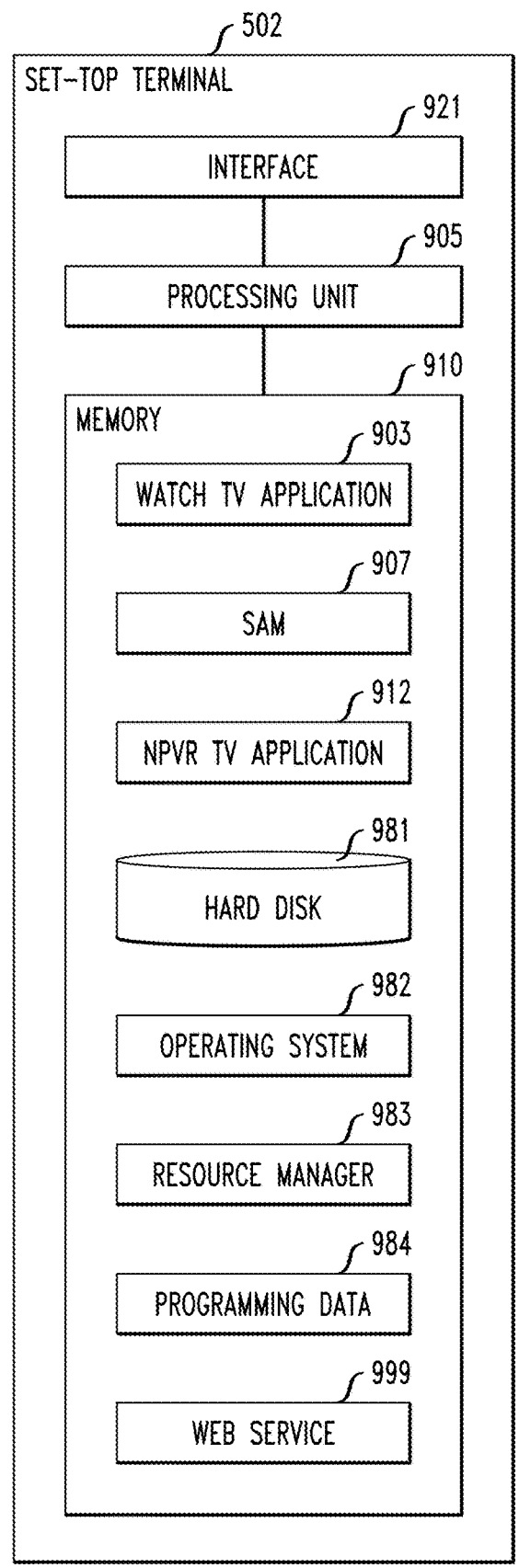
FIG. 7 is an exemplary block diagram of a set-top terminal forming a portion of the system of FIG. 5.

FIG. 7 shows an example of a set-top terminal 502. However, it is to be emphasized that other embodiments may employ different configurations; for example, with less functionality. A conventional "Watch TV" application (denoted 903 in FIG. 7) is installed in the set-top terminal 502 to service those program channels (or programs) afforded a traditional broadcast service. Watch TV application 903, residing in memory 910, provides such well known functions as channel navigation control, channel selection in response to a channel change event, etc. A channel change event occurs when a user at set-top terminal 900 issues a command to change from one program channel to another. Such a command may be issued, say, using a remote control (not shown), which signal is receptive by set-top terminal 900. Memory 910 in this instance comprises one or more caches, disks, hard drives, non-volatile random access memories (NVRAMs), dynamic random access memories (DRAMs), read-only memories (ROMs), and/or Flash ROMs.

For example, in memory 910, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to set-top terminal 502 from head-end 150 after set-top terminal 502 has been deployed at the user's premises.

Processing unit 905 orchestrates the operations of set-top terminal 900. It executes instructions stored in memory 910 under the control of the operating system. Service application manager (SAM) 907 forms part of such an operating system of terminal 502. SAM 907 is responsible for, among other things, monitoring channel change events; administering channel, service and other tables in terminal 502; and maintaining a registry of applications in terminal 502. One such application is the aforementioned Watch TV application 903 which is invoked to service a traditional broadcast channel (or program). Another potential application is a so-called "NPVR TV" application 912 which is invoked to service NPVR (network personal video recorder) enabled channels (or programs), and which may be downloaded from head-end 150 to memory 910. Application 912, among other things, emulates the functionality of a personal video recorder by responding to rewind, pause and fast-forward commands initiated by a user, and communicating such commands to head-end 150 through interface 921 to perform the trick mode (i.e., rewind, pause and fast-forward) functions on programs. In addition, for example, application 912 not only allows a user to reserve future broadcast programs for review, but also reserve, play or restart programming content that has broadcast. Interface 921 allows receipt of in-band and out-of-band material from head end 150, as well as sending communications to the head end via a reverse data channel (for example, of the kind(s) discussed above).

In some instances, terminal 502 provides digital video recorder (DVR) functionality. For example, memory 910 may include a hard disk 981 for storing digital programs to be recorded. Some portions of memory 910 (e.g., ROM and some RAM) may be located on processing unit 905. While terminal 502 may provides DVR functionality, in other instances, separate set-top terminals are associated with separate DVRs.

In some instances of memory 910, NVRAM may be used for storage of a user's settings and set-top terminal configuration settings, such as parental control codes, favorite channel lineups, set-top terminal setups, channel maps, authorization tables, and forward data channel (FDC) address assignments. DRAM may be used for most application and operating system storage requirements, such as stacks, heaps, graphics, interactive program guide data, marketing data and usage data, and functions such as MPEG-2 or MPEG-4 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system 982. Flash ROM may be used for storage of resident application software, as well as patches of the operating system and application software, which software and/or patches are downloaded to set-top terminal 502 from head-end 150 after set-top terminal 502 has been deployed at the user's premises.

Communication with head end 150 or other intermediate nodes may be through interface 921. Instructions for what programs are to be recorded may be stored in a location 984.

Interface 921 may include an RF front end (including demodulator and decryption unit) for interface with the network, as well as a plurality of different types of interfaces (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Other components which may be utilized within the terminal 502 include RF tuner stages, buffer memory (which may be implemented in RAM or otherwise), various processing layers (e.g., DOCSIS MAC or DAVIC OOB channel, MPEG, etc.) as well as media processors and other specialized system-on-chip (SoC) or application-specific integrated circuit (ASIC) devices. These additional components and functionality are, in and of themselves, well known to those of ordinary skill in the cable and embedded system fields, and accordingly are not described further herein.

The terminal 502 may also be provided with an OCAP-compliant monitor application and Java-based middleware which, inter alia, manages the operation of the terminal and applications running thereon. It will be recognized by those of ordinary skill that myriad different device and software architectures may be used consistent with the invention.

Memory 910 can include a number of applications, and an operating system (kernel) 982. A resource manager 983 may also be provided. The web service 999 can be another one of the applications or, in some cases, the web service, watch TV application, and NPVR TV application are integrated together in a single application referred to as a digital navigator.

Figure 8:
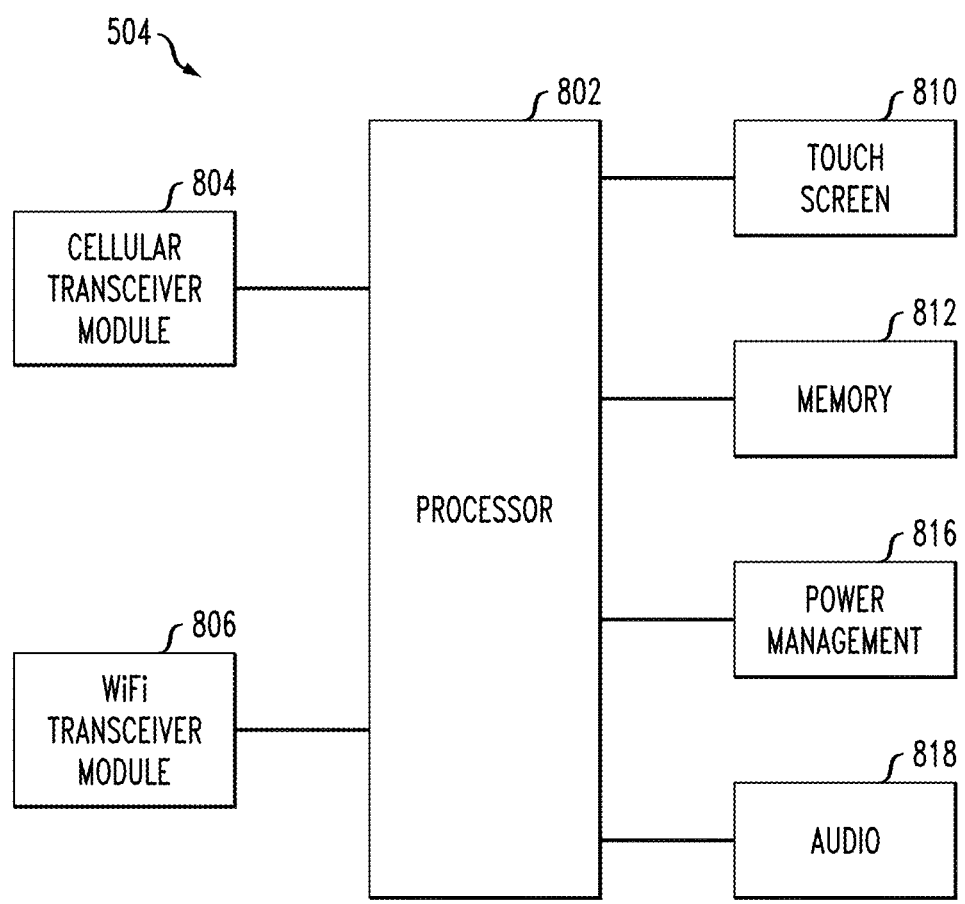
FIG. 8 is an exemplary block diagram of a tablet computing device forming a portion of the system of FIG. 5.

FIG. 8 is a block diagram of an exemplary tablet computing device 504, also indicative of a smart phone or the like. Tablet computing device 504 includes a suitable processor; e.g., a microprocessor 802. An optional cellular transceiver module 804 coupled to processor 802 includes an antenna and appropriate circuitry to send and receive cellular telephone signals, e.g., 3G or 4G. A WiFi transceiver module 806 coupled to processor 802 includes an antenna and appropriate circuitry to allow tablet computing device 504 to connect to the Internet via a wireless network access point or hotspot. The skilled artisan will appreciate that "Wi-Fi" is a trademark of the Wi-Fi Alliance and the brand name for products using the IEEE 802.11 family of standards.

A preferred implementation of the invention uses the aforementioned transition application in memory 812 which when loaded into RAM causes the processor 802 to implement the functionality described herein.

Touch screen 810 coupled to processor 802 is also generally indicative of a variety of devices such as a keypad, another type of display, a mouse or other pointing device, and so on, all of which may or may not be present in one or more embodiments. Memory 812 coupled to processor 102 is discussed further below. Audio module 818 coupled to processor 802 includes, for example, an audio coder/decoder (codec), speaker, headphone jack, microphone, and so on. Power management system 816 can include a battery charger, an interface to a battery, and so on.

Figure 9:
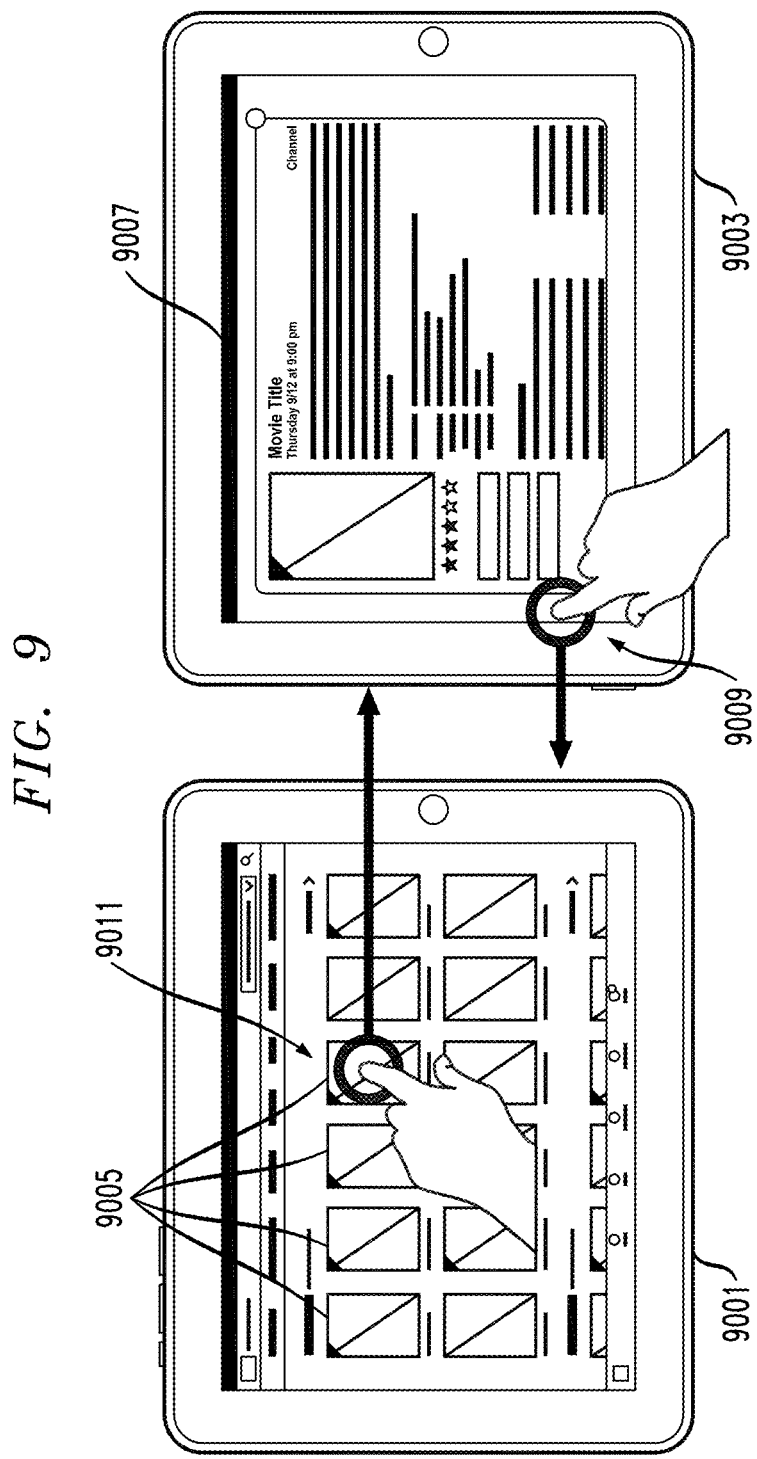
FIG. 9 shows an exemplary product page overlay, according to an aspect of the invention.

Non-limiting exemplary descriptions of a UI afforded by tablet device 504 or the like will now be provided. FIG. 9 shows an exemplary Product Page Overlay. At 9001, the user selects any program, whether from a list, a grid, or the player. Here, there are a plurality of pieces of art 9005, arranged in a grid, and each representative of an available program, movie, or the like. The user selects a given one of the pieces of art, as seen at 9011. As seen at 9003, this causes the product description to be presented as an overlay 9007. The overlay allows the user to freely explore related and similar content, within the overlay, without sacrificing his or her relative location within the application. The Product Page overlay pops up over any other template, and the user may dismiss the overlay at any time by tapping the close button at the top right, or simply clicking outside the overlay area, as seen at 9009.

Figure 10:
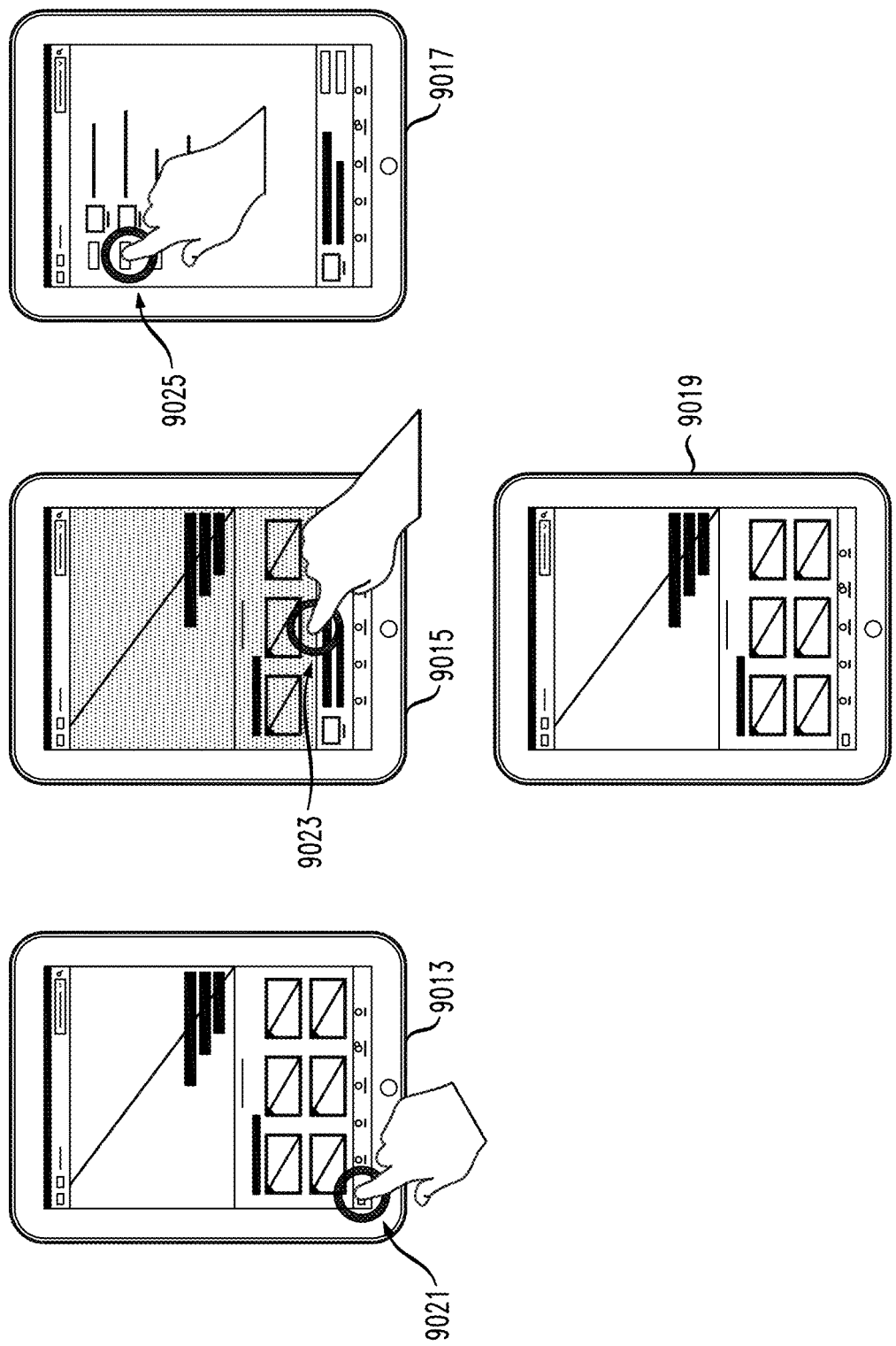
FIG. 10 shows exemplary connection of associated devices, according to an aspect of the invention.

FIG. 10 shows exemplary connection of associated devices. In one or more embodiments, from the user experience perspective, while the application on device 504 may be in communication with multiple other devices (e.g., STBs 502) simultaneously and be aware of what is playing on each of them, it is only connected with a single one of the devices as the default device (e.g., one of the STBs 502). It is to be emphasized that this is a presently preferred approach for simplifying the user experience, but from a technological standpoint, is not a limitation. That is to say, by only allowing a single default device at a time, the user experience is simplified since only that default device is tuned or otherwise controlled in response to a "flick" gesture or the like. However, if desired, more that one device, or even all devices in the premises, could be tuned or otherwise controlled in response to the single gesture. Referring to 9013, if the user needs to switch the device to which the application on device 504 is currently connected, he or she simply taps the paired device icon located in the bottom left corner of the layout, revealing the enhanced device user interface, as seen at 9021.

Referring now to 9015, in a non-limiting specific example of one user interface, the enhanced device user interface slides into view from behind the Tab Bar. The enhanced device user interface contains information about the currently connected device, with a link to edit that device name, program information about the program currently airing or streaming on that device, and the options to watch or record that program. As seen at 9023, to access a listing of all devices, the user selects the "More" button located at the top center of the enhanced device user interface.

It is to be emphasized that user interface details may vary in other embodiments.

Turning now to 9017, the expanded view of the enhanced device user interface lists all devices that are available on the network. All devices that are paired are grouped at the top of the list, and have a "Connect/Disconnect" button. The currently paired device button states "disconnect" and its state is reinforced with a green dot or other indication. The user can select any disconnected device to connect with that device, as seen at 9025.

Referring to 9019, once a new device is connected, the icon in the tab bar is updated to reflect the attributes of the new connection. From this point, any DVR management actions, gesture-based tuning actions, and so on, will be implemented on this newly connected device.

FIG. 11 shows exemplary gesture-based tuning functionality. Gesture based platforms are direct manipulation interfaces and the application on tablet device 504 preferably takes advantage of that fact when and where possible. Whenever the user is presented with a grid of programs, as seen at 9027, he or she is able to focus a specific asset by touching and holding, as seen at 9031. When the asset is focused and free to be manipulated independently from the surrounding grid or list, it becomes enlarged.

Referring now to 9029, when an asset is focused, and that asset is available to be tuned or streamed, the user can flick the focused item off the top of the interface, as seen at 9035, causing the connected device to immediately tune the channel or start the session. Alternatively, as seen at 9033, the user may drag the focused asset to the enhanced device user interface, and "drop" it on the connected device.

Further exemplary details regarding the enhanced device user interface are seen in FIG. 12. View 9037 shows the tablet in a horizontal format. View 9039 shows the tablet in a vertical format. In the example of FIG. 12, the tablet device 504 is associated with the living room TV which at that moment is displaying a football game.

Figure 13:
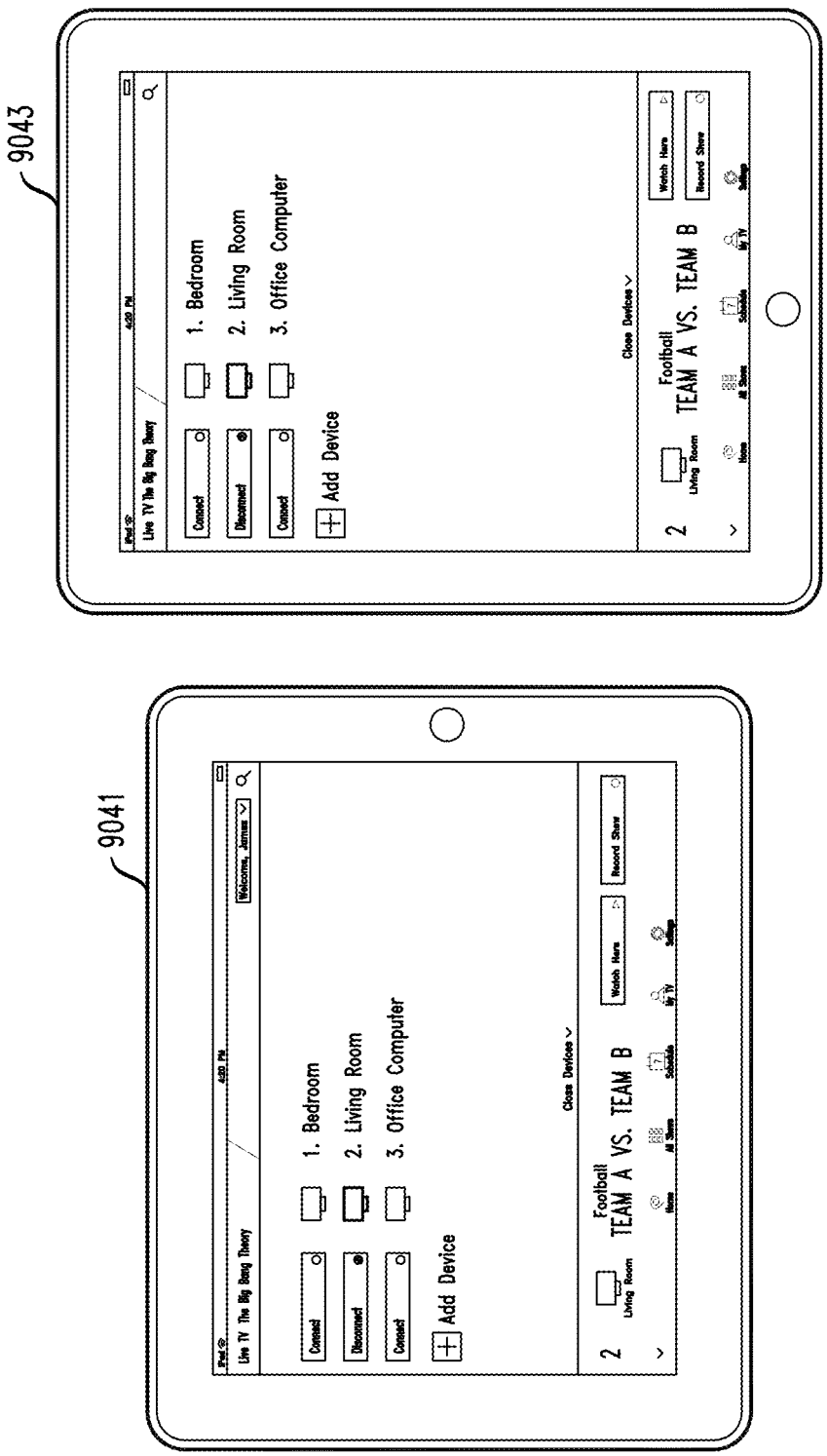

Even further exemplary details regarding the enhanced device user interface are seen in FIG. 13, wherein the enhanced device user interface is seen in an expanded mode. View 9041 shows the tablet in a horizontal format. View 9043 shows the tablet in a vertical format. In the example of FIG. 13, there are three different devices with which the tablet device 504 can potentially be associated, namely, the bedroom TV, living room TV, and office computer. In this example, as in FIG. 12, the tablet device 504 is associated with the living room TV which at that moment is displaying a football game. The icon for the living room TV is preferably highlighted in some manner to show that it is the device with which the tablet device 504 is currently associated; for example, it may be displayed in green and an adjacent button may afford an opportunity to disconnect, while the icons for the bedroom TV and office computer may be displayed in a non-highlighted manner and the adjacent buttons may afford an opportunity to connect.

FIG. 14 shows exemplary functionality for associating an item with a device icon. At 9045, the user drags an item towards the device icon, which in this case indicates that the tablet device 504 is associated with the living room TV which at that moment is displaying "Program Title 01." As the user drags the item towards the device icon, the title collapses. As seen at 9047, after the title collapses, all available devices expand outward from left to right. Here, the living room TV is device 1 and there are two other devices. Referring to 9049, as the user closes in on a specific device, that device icon scales up from top center to greet the icon for the item being dragged. When the user releases, as seen at 9051, the intended icon changes color to reflect a successful action. After notifying the user of a successful action, the row of devices collapses to the left, as seen at 9053, leaving only the selected icon. The program title slides out from left to right. Now the Bedroom TV, device 2, is associated with the tablet device 504. In at least some embodiments, moving the icon onto the desired device icon also resets the default device to that associated with the desired device icon (in the non-limiting example of FIG. 14, the default device changes from 1 to 2).

FIG. 15 shows exemplary functionality for adding an item to a playlist. At 9055, the user drags an item towards the navigation area (top right). At 9057, the user can drag the selected item to the My TV folder, which will add the program to the user's playlist. As the user approaches the folder icon, the folder icon scales to greet the icon representing the item being added to the playlist. Referring to 9059, when the user releases the item over the My TV icon, the icon returns to its original scale, turns blue (or has some other indication), and a plus icon or the like appears momentarily to confirm the action. After a moment, the plus icon fades away with the blue focus state of the icon, and the navigation icons are returned to normal, as seen at 9061. At this point, if the video moved to automatically reveal the navigation icons, then the video returns to its original coordinates.

Figure 16:
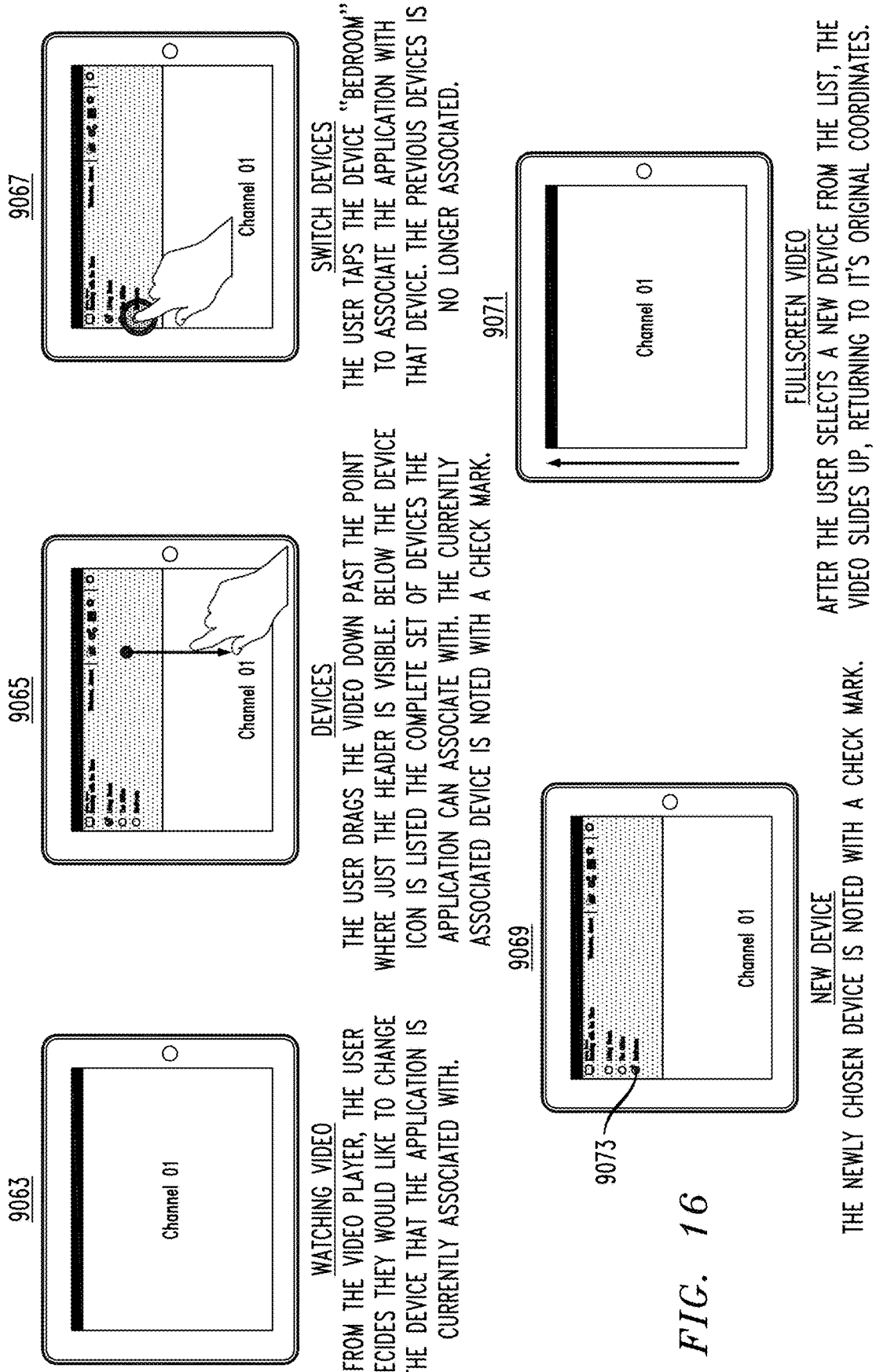
FIG. 16 shows exemplary switching of devices, according to an aspect of the invention.

FIG. 16 shows exemplary functionality for changing the device that the application running on tablet device 504 is associated with. From the video player, the user decides that he or she would like to change the device that the application is currently associated with, as at 9063. At 9065, the user drags the video down past the point where just the header is visible. Below the device icon is listed the complete set of devices the application can associate with, here, "living room," "the office," and "bedroom." The currently associated device ("living room") is noted with a check mark.

At 9067, to switch devices, the user taps the device "Bedroom" to associate the application running on tablet device 504 with that device. The previous device is no longer associated. As seen at 9073 in view 9069, the newly chosen device is noted with a check mark. After the user selects a new device from the list, the video slides up, as indicated by the arrow in view 9071, returning to its original coordinates.

Additional gesture-based tuning functionality is shown in FIG. 17. From the video player on the device 504, as at 9075, the user decides that he or she would like to watch the current video on his or her large screen TV. As seen at 9077, the user presses and holds on the video to "grab" it. After a moment, the box art for the current video pops up, attached to the users finger, as seen at 9079. If the user "flicks" the video toward the top of the UI, then the currently associated set top will tune to the program, as seen at 9081. The angle α does not necessarily have any significance from the standpoint of what is technologically possible, but is helpful in one or more embodiments from the standpoint of the user interface experience. In one or more embodiments, "flicking" or "throwing" the program icon in a direction within the angle α is interpreted as a tuning request. However, any other direction could be chosen, or any direction at all could be interpreted as a tuning request, for example.

FIG. 18 shows adding a program to a playlist. From the video player on the device 504, as at 9083, the user decides that he or she would like to add the current program to his or her playlist. The user presses and holds on the video to "grab" it, as seen at 9085. After a moment, the box art for the current video pops up, attached to the user's finger, as seen in view 9087. As the user drags the icon toward the top of the UI, as seen at the upward arrow in view 9089, the video slides down, as seen by the downward arrow, revealing the navigation icons. The user may choose to drop the box art on the playlist or share icons. As the user drags toward the row of icons, the icons scale to meet the box art. The user drops the box art on the playlist icon. If the program was a linear broadcast, then a recording is created. If the program was an on demand session, then a bookmark is created. Successfully adding an item to the playlist is reflected with a "plus" that appears briefly over the icon, as seen at 9092 in view 9091, and the folder icon turns blue. After the user successfully adds the program to his or her playlist, the video slides up, returning to its original coordinates, as indicated by the upward arrow in view 9093.

With reference to FIG. 19, further comments will now be provided on the enhanced device user interface. In one or more embodiments, the enhanced device user interface is available via the tab bar 9095. It is accessed by an icon 9097 located on the far left of the bar, separate from the global navigation icons. The enhanced device user interface is a tool with which the user can pair and connect with other devices within his or her home. The non-limiting user interface experience depicted in FIG. 19 makes use of two stages, 9091 and 9093. One tap on the device icon 9097 will reveal the enhanced device user interface 9099, displaying what the associated device (living room TV, device 2) is currently doing (in FIG. 19, displaying a football game). The associated device's name and device type 9101 are available next to the device number 9103. The current program 9105 is displayed using a standard program lockup, with a progress bar 9107 immediately below. To the right there are two action buttons. "Watch Here" button 9109 will launch the player on the tablet device 504 and tune the tablet device 504 to the program that was on the connected device (living room TV device 2). "Record" button 9111 will request that the associated device (e.g., STB with a hard drive attached to living room TV device 2) record the current program. As used herein, and as will be appreciated by the skilled artisan, a "program lockup" refers to the order in which the channel logo, channel name, and channel number are presented.

Selecting the "View All" button 9113 at the top of the tray will take the user to the devices page, seen at 9093, and allow the user to pair other devices, edit those devices, and connect with a single device. All devices available and recognized by the application are listed; here, bedroom TV—device 1; living room TV—device 2, and office computer—device 3. The user may choose to pair with any device in the list (if applicable) and give that device a custom name. If the user's device of interest is not available in the list, he or she may choose "Add Device" button 9115 and add that device manually. Of all the paired devices, only one can be connected at a time. The user may quickly select which device to connect to from the list of all paired devices. The connected device is represented in green, and the "Connect" button switches to a "Disconnect" button. That is, the devices that are not currently connected (here, bedroom TV—device 1 and office computer—device 3) each have a "connect" button to their left, to permit connecting the tablet to them, whereas the device that is currently connected (here, living room TV—device 2) is highlighted and has a "disconnect" button to its left.

FIG. 20 shows exemplary tuning to a device. As seen at 9117, from the video player, the user decides he or she would like to watch the current video on his or her large screen TV. The user presses and holds on the video to "grab" it, as seen in view 9119. After a moment, the box art for the current video pops up, as seen at 9121, attached to the user's finger. Turning to view 9123, if the application is not currently associated with the correct device, the user may drag to the top left of the interface, as indicated by the arrow, to expose the device icon. As the user approaches the top of the UI, the video slides down, revealing the navigation header with the device icon. As the user approaches the device icon, separate icons for each device available slide out from underneath the associated device icon, as indicated by the rightward arrow at the upper left hand corner of view 9125. Once all devices are revealed, the user chooses to watch the program on device 2 by dropping the box art on that device's icon. This is seen in view 9127. When the user releases the box art, the icon for the selected device turns blue (or has some other indication) to indicate that the action was successful. As per view 9129, after the user selects a new device from the list, the video slides up, returning to its original coordinates. From this point forward, the default device is the device the user indicated by dropping the icon to tune in view 9127.

Given the discussion thus far, it will be appreciated that, in general terms, an exemplary method, according to an aspect of the invention, includes the step of displaying, on a companion device having a touch screen interface (for example, a tablet computer 504 in FIGS. 5 & 8 or smart phone), a plurality of icons, as seen at 9027 in FIG. 11. The icons can be manipulated by the touch screen interface. Each of the plurality of icons represents a different one of a plurality of audiovisual assets which can be viewed on an external audiovisual device (e.g., one of the STBs 502 in FIGS. 5 and 7). As seen at 9029 in FIG. 11, a further step includes obtaining, from a user of the companion device, an input gesture such as 9035 in FIG. 11 on the touch screen interface, wherein a given one of the icons is flicked in a manner associated with the external audiovisual device (by way of example and not limitation, "flicking" to the top of the screen as shown in FIG. 17 at 9081). A still further step includes, responsive to the obtaining of the gesture, dispatching a signal from the companion device (e.g., 504). The signal causes the external audiovisual device to access a given one of the plurality of audiovisual assets associated with the given one of the icons.

In at least some embodiments, a further step includes downloading an application (transition application) onto the companion device, wherein the displaying, obtaining, and dispatching step are carried out, at least in part, by executing the application on the companion device. In some such cases, the downloading includes downloading from an on-line application store 514 in FIG. 5, which in at least some cases is maintained by the manufacturer of the companion device. Such an application from an application store is typically a native application. In some such cases, the external audiovisual device accesses the given one of the plurality of audiovisual assets associated with the given one of the icons over a hybrid fiber coaxial network 101 via a radio frequency quadrature amplitude modulation scheme; the user of the companion device has a data subscription over the hybrid fiber coaxial network; and the downloading includes downloading from a web application server 512 in FIG. 5, via the data subscription of the user. Such an application from a web application server is typically a web application.

In some cases, further steps include obtaining, from the user of the companion device, an indication, on the touch screen interface, that the user wishes to focus on the given one of the icons (examples are shown at 9011 in FIGS. 9 and 9031 in FIG. 11); and, responsive to the indication that the user wishes to focus on the given one of the icons, displaying on the companion device a screen with additional details regarding the given one of the plurality of audiovisual assets associated with the given one of the icons, as seen at 9007 in FIG. 9. In some cases, the input gesture is obtained from the screen with the additional details. On the other hand, in some cases, the input gesture is obtained from a screen showing the plurality of icons, as seen at 9027, 9031 in FIG. 11.

In some instances, additional steps include obtaining, at the companion device, from a network address resolver 510 in FIG. 5 at a remote location, a network address of the external audiovisual device. In some such cases, the dispatching of the signal from the companion device includes dispatching the signal from the companion device to the external audiovisual device over a premises network. However, in other cases, the dispatching of the signal from the companion device includes dispatching the signal from the companion device back into the network cloud of FIG. 5 and then back down to the external audiovisual device over a suitable connection (for example, a suitable IP connection such as a DSG connection).

In some cases, the plurality of icons is a first plurality of icons and the external audiovisual device is one of a plurality of external audiovisual devices 502. In such cases, a further step can include displaying, on the companion device, a second plurality of icons, such as are seen in views 9041, 9043 of FIG. 13. Each of the second plurality of icons represents a different one of the plurality of external audiovisual devices with which the companion device can be associated. The external audiovisual devices are, in some cases, collocated with the companion device. However, if desired, device 504 could be used to control external audiovisual devices with which it is not collocated (for example, to remotely control a television being watched by a child). A still further step can include obtaining, at the companion device, a selection from the user. The selection specifies a given one of the plurality of external audiovisual devices to be currently associated with the companion device. This process is shown, for example, in FIG. 16. Note especially the selection of the new device in view 9067. In such cases, the signal that is dispatched from the companion device to cause the external audiovisual device to access the given one of the plurality of audiovisual assets is dispatched to the given one of the plurality of external audiovisual devices selected to be currently associated with the companion device. Stated in another way, in one or more embodiments, the gesture-based tuning feature causes the program that is "flicked" to be displayed on the external audiovisual device that is currently associated with the transition application.

Given the discussion thus far, it will be appreciated that, in general terms, another exemplary method, according to another aspect of the invention, includes the step of displaying, on a companion device (for example, a tablet computer 504 in FIGS. 5 & 8 or smart phone, or a laptop computer or the like, possibly without a touch screen), a plurality of icons, as seen at 9027 in FIG. 11. Each of the plurality of icons represents a different one of a plurality of audiovisual assets which can be viewed on an external audiovisual device (e.g., one of the STBs 502 in FIGS. 5 and 7). In some cases, the external audiovisual device is collocated with the companion device; however, as set forth elsewhere herein, this is not a limitation.

A further step includes obtaining, at the companion device, from a network address resolver 510 in FIG. 5 at a remote location, a network address of the external audiovisual device. A still further step includes obtaining, from a user of the companion device, a selection of a given one of the icons (an input gesture such as 9033 and/or 9035 in FIG. 11 is a non-limiting example). An even further step includes, responsive to the selection, dispatching a signal from the companion device (e.g., 504). In some cases, the signal is dispatched over a premises network; however, as set forth elsewhere herein, this is not a limitation. The signal is sent to the network address of the external audiovisual device, to cause the external audiovisual device to access a given one of the plurality of audiovisual assets associated with the given one of the icons.

In at least some embodiments, a further step includes downloading an application (transition application) onto the companion device, wherein the displaying step, the obtaining steps, and the dispatching step are carried out, at least in part, by executing the application on the companion device. In some such cases, the downloading includes downloading from an on-line application store 514 in FIG. 5, which in at least some cases is maintained by the manufacturer of the companion device. Such an application from an application store is typically a native application. In some such cases, the external audiovisual device accesses the given one of the plurality of audiovisual assets associated with the given one of the icons over a hybrid fiber coaxial network 101 via a radio frequency quadrature amplitude modulation scheme; the user of the companion device has a data subscription over the hybrid fiber coaxial network; and the downloading includes downloading from a web application server 512 in FIG. 5, via the data subscription of the user. Such an application from a web application server is typically a web application.

In some instances, additional steps include obtaining, at the companion device, from a network address resolver 510 in FIG. 5 at a remote location, a network address of the external audiovisual device. In some such cases, the dispatching of the signal from the companion device includes dispatching the signal from the companion device to the external audiovisual device over the premises network; however, as set forth elsewhere herein, this is not a limitation.

In some cases, the plurality of icons is a first plurality of icons and the external audiovisual device is one of a plurality of external audiovisual devices 502. In such cases, a further step can include displaying, on the companion device, a second plurality of icons, such as are seen in views 9041, 9043 of FIG. 13. Each of the second plurality of icons represents a different one of the plurality of external audiovisual devices with which the companion device can be associated. In some cases, the external audiovisual devices are collocated with the companion device; however, as set forth elsewhere herein, this is not a limitation. A still further step can include obtaining, at the companion device, a selection from the user. The selection specifies a given one of the plurality of external audiovisual devices to be currently associated with the companion device. This process is shown, for example, in FIG. 16. Note especially the selection of the new device in view 9067. In such cases, the signal that is dispatched from the companion device to cause the external audiovisual device to access the given one of the plurality of audiovisual assets is dispatched to the given one of the plurality of external audiovisual devices selected to be currently associated with the companion device. Stated in another way, in one or more embodiments, a tuning feature causes the program that is selected on the companion device to be displayed on the external audiovisual device that is currently associated with the transition application.

Many variations and alternative embodiments will be apparent to the skilled artisan from the description herein. For example, in some instances, rather than communication via WiFi or the like, in some instances, the tablet or similar device may send commands back into the network cloud of FIG. 5 using cellular communications such as GSM, 2G, 3G, 4G, or the like.

Given the discussion thus far, it will be appreciated that, in general terms, still another exemplary method, according to still another aspect of the invention, includes the step of displaying, on a companion device, a plurality of icons, such as are seen in views 9041, 9043 of FIG. 13. Each of the plurality of icons represents a different one of a plurality of external audiovisual devices with which the companion device can be associated. In some cases, the external audiovisual devices are collocated with the companion device; however, as set forth elsewhere herein, this is not a limitation.

Another step includes obtaining, at the companion device, a selection from a user thereof. The selection specifies a given one of the plurality of external audiovisual devices to be currently associated with the companion device. This process is shown, for example, in FIG. 16. Note especially the selection of the new device in view 9067.

A further step includes displaying, on the companion device, data about a program currently playing on the given one of the external audiovisual devices that is currently associated with the companion device. This feature is seen, for example, in FIG. 19 at 9105. A still further step includes obtaining, at the companion device, an indication from a user thereof, that the user desires to watch, on the companion device, the program currently playing on the given one of the external audiovisual devices that is currently associated with the companion device (e.g., user actuates "watch here" button 9109). An even further step includes, responsive to the indication, playing, on the companion device, the program currently playing on the given one of the external audiovisual devices that is currently associated with the companion device.

In some instances, a further step includes obtaining, at the companion device, from a network address resolver 510 in FIG. 5 at a remote location, a network address of at least the given one of the external audiovisual devices that is currently associated with the companion device. To avoid confusion, it is worth noting that in a preferred but non-limiting approach, the companion device obtains the network addresses for all the available external audiovisual devices. The displaying, on the companion device, of the data about the program currently playing on the given one of the external audiovisual devices that is currently associated with the companion device, includes:

the companion device communicating with a web service 999 on at least the given one of the external audiovisual devices 502 that is currently associated with the companion device to determine an identity of the program currently playing on the given one of the external audiovisual devices that is currently associated with the companion device; and the companion device communicating with a remote metadata service 508 in FIG. 5 to obtain enhanced data about the program currently playing on the given one of the external audiovisual devices that is currently associated with the companion device—the enhanced data is not available on the given one of the external audiovisual devices that is currently associated with the companion device.

In such cases, the playing, on the companion device, of the program currently playing on the given one of the external audiovisual devices that is currently associated with the companion device includes the companion device requesting, via a data connection to an external content data network 516 in FIG. 5, streaming of the program currently playing on the given one of the external audiovisual devices in a form for display on the companion device.

In at least some embodiments, a further step includes downloading an application (transition application) onto the companion device, wherein the displaying steps and the obtaining steps are carried out, at least in part, by executing the application on the companion device.

In some such cases, the downloading includes downloading from an on-line application store 514 in FIG. 5, which in at least some cases is maintained by the manufacturer of the companion device.

In some such cases, the external audiovisual device accesses the given one of the plurality of audiovisual assets associated with the given one of the icons over a hybrid fiber coaxial network 101 via a radio frequency quadrature amplitude modulation scheme; the user of the companion device has a data subscription over the hybrid fiber coaxial network; and the downloading includes downloading from a web application server 512 in FIG. 5, via the data subscription of the user.

Given the discussion thus far, it will be appreciated that, in general terms, an even further exemplary method, according to an aspect of the invention, includes the steps of providing, to a companion device 504, from a web service 999 executing on an external audiovisual device 502, an identity of a program currently playing on the external audiovisual device; obtaining, from the companion device, at the external audiovisual device, an indication that the program currently playing on the external audiovisual device is to be streamed to the companion device; and, responsive to the indication, streaming the program currently playing on the external audiovisual device to the companion device (for example, using DLNA functionality as described elsewhere herein).

One or more embodiments include an article of manufacture comprising a computer program product, the computer program product in turn comprising a tangible computer-readable recordable storage medium, storing in a non-transitory manner computer readable program code, the computer readable program code in turn comprising computer readable program code configured to carry out any one, some, or all of the method steps set forth herein.

One or more embodiments include downloading an application, such as a transition application, embodied in such a storage medium, from an "app" store and/or a web server, to a companion device over a suitable network such as a wired or wireless network.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Figure 21:
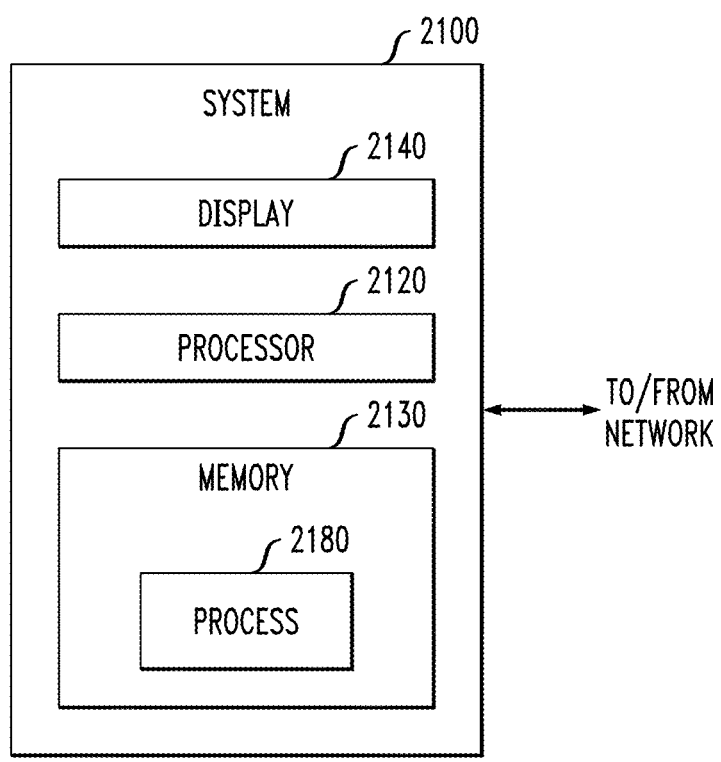
FIG. 21 is a block diagram of a computer system useful in connection with one or more aspects of the invention.

FIG. 21 is a block diagram of a system 2100 that can implement at least some aspects of the invention, and is representative, for example, of the servers shown in the figures. The processor, memory, and process are also representative of aspects of the functionality of companion devices such as tablet devices, and the like. As shown in FIG. 21, memory 2130 configures the processor 2120 to implement one or more methods, steps, and functions (collectively, shown as process 2180 in FIG. 21) described herein. The memory 2130 could be distributed or local and the processor 2120 could be distributed or singular. Different steps could be carried out by different processors.

The memory 2130 could be implemented as an electrical, magnetic or optical memory, or any combination of these or other types of storage devices; it is also representative of memory 812. It should be noted that if distributed processors are employed, each distributed processor that makes up processor 2120 generally contains its own addressable memory space. It should also be noted that some or all of computer system 2100 can be incorporated into an application-specific or general-use integrated circuit. For example, one or more method steps could be implemented in hardware in an ASIC rather than using firmware. Display 2140 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 2100 or processing capability on a firewall, intrusion prevention system, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on the companion device of FIG. 8, a laptop computer, a server, or the like, and that such program may be embodied on a tangible computer readable recordable storage medium. As used herein, including the claims, a "server" includes a physical data processing system (for example, system 2100 as shown in FIG. 21) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules and/or sub-modules embodied on one or more tangible computer readable storage media. All the modules (or any subset thereof) can be on the same medium, or each can be on a different medium, for example. The modules can include any or all of the components shown in the figures that might be implemented in software executing on a processor. The method steps can then be carried out using the distinct software modules of the system, as described above, executing on one or more hardware processors (e.g., a processor or processors in a server 603, processor 306, processor 905, processor 802, and the like). Further, a computer program product can include a tangible computer-readable recordable storage medium with code adapted to be executed to carry out one or more method steps described herein, including the provision of the system with the distinct software modules. In some cases, the application downloaded to device 504 or the like comprises a distinct software module, optionally with sub-modules to implement the specific functionality described herein.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    communicating, by a companion device having a touch screen interface and that has a data subscription connectivity over a hybrid fiber coaxial network, with a network address resolver disposed at a first remote location from said companion device;
    obtaining, from said network address resolver, network addresses for a plurality of available external audiovisual devices using said data subscription connectivity;
    obtaining, at said companion device, from said network address resolver at said first remote location, a network address of a currently associated external audiovisual device of said external audiovisual devices using a subscriber account of a user of said companion device, wherein said first remote location of said network address resolver and a second remote location of an application web server are a same location or different locations;
    displaying, on said companion device having said touch screen interface, an icon, which can be manipulated by said touch screen interface, said icon representing an audiovisual asset which can be viewed on said available external audiovisual devices;
    obtaining, via said companion device, an input gesture on said touch screen interface; and
    responsive to said obtaining of said gesture, dispatching a signal from said companion device, said signal causing said currently associated external audiovisual device of said external audiovisual devices to access, from at least one of a content data network and said application web server at said second remote location from said currently associated external audiovisual device, said audiovisual asset associated with said icon, wherein said access of said audiovisual asset is independent of said companion device and said signal is dispatched from said companion device to said currently associated external audiovisual device over a network cloud routed according to said network address of said currently associated external audiovisual device obtained from said network address resolver.

2. The method of claim 1, further comprising downloading an application onto said companion device, wherein said displaying, obtaining said input gesture, and dispatching steps are carried out, at least in part, by executing said application on said companion device.

3. The method of claim 2, wherein said downloading comprises downloading from an on-line application store maintained by a manufacturer of said companion device, and wherein said application comprises a native application.

4. The method of claim 2, wherein:
    said currently associated external audiovisual device accesses said audiovisual asset associated with said icon over a hybrid fiber coaxial network via a radio frequency quadrature amplitude modulation scheme, wherein assessing said audiovisual asset comprises tuning, by said currently associated external audiovisual device, to said audiovisual asset streaming from said content data network or said application web server;
    said companion device has said data subscription connectivity over said hybrid fiber coaxial network; and
    said downloading comprises downloading from a web application server via said data subscription connectivity, said application comprising a web application.

5. The method of claim 1, further comprising:
    obtaining, via said companion device, an indication, on said touch screen interface, that said icon is focused; and
    responsive to said indication that said icon is focused, wherein said icon becomes a focused icon, displaying on said companion device a screen with additional details regarding said audiovisual asset associated with said focused icon;
    wherein said input gesture is obtained from said screen with said additional details.

6. The method of claim 1, wherein said input gesture is obtained as a manipulation of said icon from said touch screen interface displaying said icon.

7. The method of claim 1, wherein said currently associated external audiovisual device is one of said plurality of available external audiovisual devices, further comprising:
- displaying, on said companion device, a second icon representing a different one of said plurality of available external audiovisual devices with which said companion device can be associated; and
- obtaining, at said companion device, a selection specifying said different one of said plurality of available external audiovisual devices to be currently associated with said companion device;
- wherein said signal is dispatched to said different one of said plurality of available external audiovisual devices selected to be currently associated with said companion device.

8. An article of manufacture comprising a computer program product, said computer program product comprising:
- a tangible computer-readable recordable storage medium, storing computer readable program code in a non-transitory manner, wherein the computer readable program code executing on a processor of a companion device having a touch screen interface is configured to:
- communicate, by said companion device that has a data subscription connectivity over a hybrid fiber coaxial network, with a network address resolver disposed at a first remote location from said computer program product;
- obtain, from said network address resolver, network addresses for a plurality of available external audiovisual devices using said data subscription connectivity;
- obtain, at said companion device, from said network address resolver at said first remote location, a network address of a currently associated external audiovisual device of said external audiovisual devices using a subscriber account of a user of said companion device, wherein said first remote location of said network address resolver and a second remote location of an application web server are a same location or different locations;
- display, on said companion device having said touch screen interface, an icon, which can be manipulated by said touch screen interface, said icon representing an audiovisual asset which can be viewed on said available external audiovisual devices;
- obtain, via said companion device, an input gesture on said touch screen interface; and
- dispatch, responsive to said obtaining of said gesture, a signal from said companion device, said signal causing said currently associated external audiovisual device of said external audiovisual devices to access, from at least one of a content data network and said application web server at said second remote location from said currently associated external audiovisual device, said audiovisual asset associated with said icon, wherein said access of said audiovisual asset is independent of said companion device and said signal is dispatched from said companion device to said currently associated external audiovisual device over a network cloud routed according to said network address of said currently associated external audiovisual device obtained from said network address resolver.

9. The article of manufacture of claim 8, further comprising computer readable program code configured to obtain said input gesture as a manipulation of said icon from said touch screen interface displaying said icon.

\* \* \* \* \*